United States Patent [19]
Horinouchi

[11] Patent Number: 5,410,468
[45] Date of Patent: Apr. 25, 1995

[54] OPTICAL PICK-UP APPARATUS

[75] Inventor: Syougo Horinouchi, Fukuoka, Japan

[73] Assignee: Matsushita Electric Industrial Co., Ltd., Osaka, Japan

[21] Appl. No.: 79,423

[22] Filed: Jun. 21, 1993

[30] Foreign Application Priority Data

| Jun. 26, 1992 | [JP] | Japan | 4-168770 |
| Jul. 30, 1992 | [JP] | Japan | 4-203345 |
| Jul. 30, 1992 | [JP] | Japan | 4-203346 |
| Aug. 18, 1992 | [JP] | Japan | 4-218948 |

[51] Int. Cl.⁶ .............................................. G11B 7/12
[52] U.S. Cl. ................................. 369/103; 369/109; 369/112
[58] Field of Search ............ 369/103, 109, 112, 44.11, 369/44.21, 44.22, 44.23; 359/15, 566, 728; 250/201.5, 201.9

[56] References Cited

U.S. PATENT DOCUMENTS

| 4,866,694 | 9/1989 | Korth | 369/110 |
| 4,945,527 | 7/1990 | Sunagawa | 369/44.21 |
| 5,122,903 | 6/1992 | Aoyama et al. | 359/565 |
| 5,180,909 | 1/1993 | Ohyama et al. | 250/201.5 |
| 5,233,444 | 8/1993 | Musha et al. | 369/109 |

FOREIGN PATENT DOCUMENTS

| 0195657 | 9/1986 | European Pat. Off. |
| 0226647 | 7/1987 | European Pat. Off. |
| 0278406 | 9/1988 | European Pat. Off. |
| 0467303 | 1/1992 | European Pat. Off. |
| 0469552 | 2/1992 | European Pat. Off. |
| 62-146444 | 6/1987 | Japan |
| 62-219341 | 9/1987 | Japan |
| 63-20737 | 1/1988 | Japan |
| 63-247925 | 10/1988 | Japan |
| 1155529 | 6/1989 | Japan |
| 1220145 | 9/1989 | Japan |
| 281335 | 3/1990 | Japan |

Primary Examiner—Paul M. Dzierzynski
Assistant Examiner—Don Wong
Attorney, Agent, or Firm—Lowe, Price, LeBlanc & Becker

[57] ABSTRACT

Not more than one compound holographic optical element is provided on an optical path starting from a semiconductor laser chip and arriving at a photo detector via an optical disk. A hologram pattern of this compound holographic optical element is the superposition of a first hologram pattern, converging a laser beam emitted from the semiconductor laser chip onto the optical disk, and a second hologram pattern, diffracting the laser beam reflected at the optical disk toward the photo detector and changing it into a focusing beam. This single holographic optical element not only realizes the convergence of the laser beam onto the optical disk and/or the photo detector and the differentiation of going and returning optical paths but reduces the size and production cost of the optical pick-up apparatus.

5 Claims, 21 Drawing Sheets

OPTICAL PICK-UP APPARATUS

BACKGROUND OF THE INVENTION

1. Field of The Invention

The present invention relates to an optical pick-up apparatus, which is used to record information into an optical disk and to reproduce the recorded information from the same.

2. Description of The Prior Art

An optical pick-up apparatus associated with an optical disk device utilizes a laser beam for record and reproduction of information. In order to realize the reduction of size and weight in such an optical pick-up apparatus, a plurality of holographic optical elements have been conventionally used. And, there is known a method of reflecting a laser beam several times in a light guide. For instance, the Japanese Unexamined Patent Applications Nos. 146444/1987 and 155529/1989 disclose a long and thin light guide made of transparent substance. In this light guide, a going laser beam is reflected several times and reaches an optical disk passing through a holographic optical element. The optical disk memorizes information on the surface thereof in the form of unit of spots or depressions. A returning laser beam reflected at the recording surface of the optical disk is again reflected several times in the light guide but is guided via a different path to an photo detector. The Japanese Unexamined Patent Application No. 20737/1988 discloses two holographic optical elements. One converges a going laser beam onto an optical disk and the other converges a returning laser beam reflected at the optical disk to a photo detector.

Furthermore, the Japanese Unexamined Patent Applications Nos. 81335/1990 and 220145/1989 disclose holographic optical elements integrally assembled with objective lenses used for causing diffraction in a returning beam after being reflected at an optical disk.

Hereinafter, above-introduced conventional optical pick-up apparatus equipped with holographic optical elements will be explained in more detail with reference to FIGS. 22 to 25. FIG. 22 shows an optical pick-up apparatus utilizing a plurality of reflections of a laser beam, as represented by the Japanese Unexamined Patent Applications Nos. 146444/1987 and 155529/1989. FIG. 23 shows an optical pick-up apparatus including a pair of holographic optical elements, one holographic optical element converging a going laser beam and the other holographic optical element causing diffraction of a returning laser beam, which is similar to that disclosed in the Japanese Unexamined Patent Application No. 20737/1988. FIG. 24 shows an optical pick-up apparatus using an objective lens on the spherical surface of which a holographic optical element is integrally or directly formed to cause diffraction of a laser beam, the same type as that disclosed by the Japanese Unexamined Patent Application No. 81335/1990. FIG. 25 shows an optical pick-up apparatus using a complex objective lens whose body is split into two by a plane normal to an axis thereof. A holographic optical element for diffraction is sandwiched therebetween, as is disclosed in the Japanese Unexamined Patent Application No. 220145/1989.

In FIG. 22, a reference numeral 501 represents a laser diode emitting a laser beam. A reference numeral 504 represents a holographic optical element converging the laser beam emitted from the laser diode 501 onto an optical disk 503 whose surface are formed with the unit of spots memorizing information being sensed by the laser beam. A reference numeral 502 represents a light guide which is made of a transparent substance such as fused silica and causes a laser beam to reflect repeatedly at inside, upper and lower, surfaces thereof. A reference numeral 505 represents a holographic optical element of reflection type which reflects a returning laser beam having once reached and been reflected at the surface of the optical disk 503 and also diffracts this returning laser beam toward a photo detector 506.

In FIG. 23, a reference numeral 507 represents a holographic optical element of transmission type which transmits a returning laser beam having been reflected at the surface of the optical disk 503 and also diffracts this returning laser beam toward the photo detector 506. The laser diode 501, optical disk 503, holographic optical element 504, and photo detector 506 are substantially the same as those explained with reference to FIG. 18.

In FIG. 24, a reference numeral 508 represents an objective lens converging a laser beam emitted from the laser diode 501 onto the optical disk 503. A reference numeral 509 represents a holographic optical element of transmission type which transmits a returning laser beam having been reflected at the surface of the optical disk 503 and also diffracts this returning laser beam toward the photo detector 506. The laser diode 501, the optical disk 503, and the photo detector 506 are substantially the same as those explained with reference to FIG. 22.

In FIG. 25, a reference numeral 510 represents a complex objective lens whose body is split by a plane normal to an axis thereof into two, upper and lower, half bodies. This complex objective lens 510 converges a laser beam emitted from the laser diode 501 onto the surface of the optical disk 503. A reference numeral 511 represents a holographic optical element of transmission type which transmits a returning laser beam having been reflected at the surface of the optical disk 503 and also diffracts this returning laser beam toward the photo detector 506. This holographic optical element 511 is sandwiched by and integrally fabricated with the paired half bodies of the complex objective lens 510. The laser diode 501, the optical disk 503, and the photo detector 506 are substantially the same as those explained with reference to FIG. 22.

Operations on above introduced conventional optical pick-up apparatus will be explained below.

In FIG. 22, a laser beam is emitted from the laser diode 501 and, then, reflected plural times at inside, upper and lower, surfaces of the light guide 502 so as to reach the holographic optical element 504. The holographic optical element 504 then converges the laser beam thus guided through the light guide 502 onto the surface of the optical disk 503. The laser beam is reflected at the surface, i.e. a recording surface, of the optical disk 503 and returns as a beam including information read out from the optical disk 502. The returning beam passes through the holographic optical element 504 again and, in turn, reaches the holographic optical element 505 of reflection type. This holographic optical element 505 not only reflects the returning laser beam but diffracts it toward the photo detector 508. The photo detector 508 receives the returning laser beam and detects focusing error and tracking error, as well as the read-out information.

The optical pick-up apparatus shown in FIGS. 23, 24, and 25 operate in the same manner as that shown in FIG. 22. A laser beam emitted from the laser diode 501 is converged onto the recording surface of the optical disk 503 passing through the holographic optical element 504, the objective lens 508, or the split-type complex objective lens 510, respectively. After having been reflected, the returning beam comprising information read out from the optical disk 503 passes through the holographic optical elements 507, 509, or 511 respectively and is diffracted toward the photo detector 506. The photo detector 506 receives the returning laser beam and detects focusing error and tracking error, as well as the read-out information.

These prior art constructions of the optical pick-up apparatus are, however, disadvantageous in complicateness of adjusting positional relationship between individual optical components. One reason of requiring complicated positional adjustment of the optical components is that the conversing arrangement and the diffracting arrangement are independent from each other. In more detail, the conversing arrangement conversing a laser beam is constituted by the holographic optical element 504, the objective lens 508, or the split-type objective lens 510. On the other hand, the diffracting arrangement diffracting the laser beam is constituted by the reflection-type holographic optical element 505 or the transmission-type holographic optical element 507, 509, 511. These conversing arrangement and the diffracting arrangement are independently mounted on the light guide 502 or installed into a casing. Therefore, it was inevitable to take a long time in an installation or fabrication of the pick-up apparatus because of not only positional adjustment of individual optical components but mutual adjustment of positional relationship between the conversing construction and the diffracting construction. This complicateness in the manufacturing process results in increase of production cost.

Furthermore, in case of the optical pick-up apparatus shown in FIG. 24, the constructional requirement of forming the transmission-type holographic optical element 509 directly on the objective lens 508 further increases the complicateness. This will be easily understood from the spherical surface of the objective lens 508 which makes the formation of the transmission-type holographic optical element 509 thereon difficult. Still further, in case of the optical pick-up apparatus shown in FIG. 25, the structure of sandwiching the transmission-type holographic optical lens 511 between the split half bodies of the complex objective lenses 510 is not only time-consuming in its assembling but tends to cause unacceptable deterioration in lens property.

SUMMARY OF THE INVENTION

Accordingly, the present invention has a purpose, in view of above-described problems or disadvantages encountered in the prior art, to provide an optical pick-up apparatus capable of realizing both the conversion of a laser beam to the optical disk and/or the photo detector and the differentiation of going and returning laser beam paths, by use of only one holographic optical element, thereby providing cheaper optical pick-up apparatus.

In order to accomplish above purposes, the present invention provides not more than one compound holographic optical element on an optical path starting from a semiconductor laser chip and arriving at a photo detector via an optical disk. A hologram pattern of this compound holographic optical element is the superposition of a first hologram pattern, converging a laser beam emitted from the semiconductor laser chip onto the optical disk, and a second hologram pattern, diffracting the laser beam reflected at the optical disk toward the photo detector and changing it into a focusing beam. This single holographic optical element not only realizes the convergence of the laser beam onto the optical disk and/or the photo detector and the differentiation of going and returning optical paths but reduces the size and production cost of the optical pick-up apparatus.

Furthermore, another aspect of the present invention provides a single holographic optical element having at least one hologram pattern.

The above and other objects, features and advantages of the present invention will become more apparent from the following detailed description which is to be read in conjunction with the accompanying drawings.

DETAILED DESCRIPTION OF THE PREFERRED EMBODIMENTS

Hereinafter, with reference to accompanying drawings, preferred embodiments of the present invention will be explained in detail.

First Embodiment

Figure 1A:
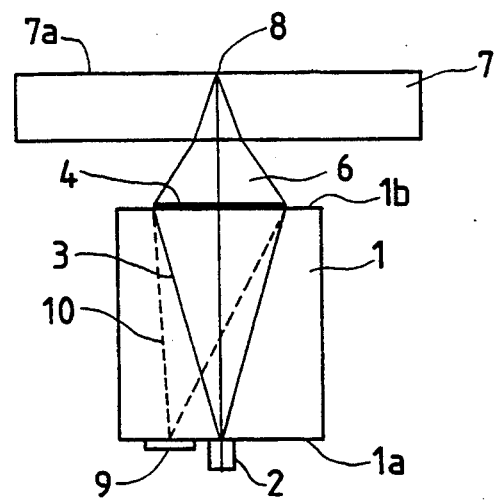
FIG. 1(a) is a schematic view showing an optical pick-up apparatus in accordance with a first embodiment of the present invention.
Figure 1B:
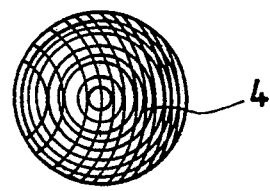
FIG. 1(b) is a view showing a hologram pattern of the first embodiment, which is constituted by superposing a first hologram pattern and a second hologram pattern.
Figure 1C:
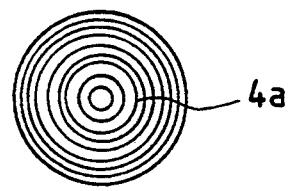
FIG. 1(c) is a view solely showing the first hologram pattern of the first embodiment.
Figure 1D:
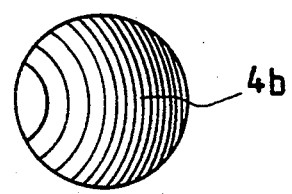
FIG. 1(d) is a view solely showing the second hologram pattern of the first embodiment.

A first embodiment of the present invention will be explained with reference to FIGS. 1(a) through 2 below. FIG. 1(a) is a schematic view Showing an optical pick-up apparatus in accordance with a first embodiment of the present invention. FIG. 1(b) is a view showing a hologram pattern of the first embodiment, which is constituted by superposing a first hologram pattern and a second hologram pattern. FIG. 1(c) is a view solely showing the first hologram pattern, and FIG. 1(d) is a view solely showing the second hologram pattern.

A going optical path, starting from the semiconductor laser serving as a light emitting element and arriving at the optical disk, will be explained first of all with reference to FIGS. 1(a) through 1(d). In FIG. 1(a), a transparent glass substance 1 gas a bottom surface la, at a center of which a semiconductor laser chip 2 is mounted securely. This semiconductor laser chip 2 emits a laser beam 3, which diffuses or diverges in the glass substance 1 and reaches a compound holographic optical element 4 formed on a top surface 1b of the glass substance 1. The compound holographic optical element 4 is depicted two hologram patterns superposed as shown in FIG. 1(b). One hologram pattern has a concentric circles pattern, in which a center of these concentric circles positions at a center of the hologram pattern and a pitch between adjacent two circles becomes small as it goes outside as shown in FIG. 1(c). This hologram pattern serves as a first hologram pattern 4a capable of focusing the diffused laser beam 3 onto an information recording layer 7a of an optical disk 7 as a spot 8. Namely, the laser beam 3 emitted from the semiconductor laser chip 2 passes through the glass substance 1, diffusing symmetrically about an axis of the glass substance 1 and, in turn, passes through the compound holographic optical element 4 disposed normal to the axis of the glass substance 1. Then, the laser means 3 is converged along the axis of the glass substance 1 onto the recording layer 7a of the optical disk 7.

The other hologram pattern has eccentric circles pattern, whose center is offset left in the drawing, which is different from that of the above-described first hologram pattern. This hologram pattern serves as a second hologram pattern 4b capable of converting the laser beam, being reflected at the recording layer 7a of the optical disk 7 and returning the same optical path 6 as the going laser beam, into a focusing beam 10, and also capable of diffracting this focusing beam 10 toward a quadrant photo detector 9 and conversing it onto the same. This second hologram pattern 4b is capable of causing astigmatic aberration as well as conversing the focusing beam 10. In other words, this second hologram pattern 4b allows the photo detector 9 to detect focusing error on the basis of the received beam 10. This is well known to those skilled in the art as the astigmatic method.

The compound holographic optical element 4 whose hologram pattern is the superposition of these first and second hologram patterns 4a and 4b, can be fabricated through various ways such as printing and the 2P (Photo Polymerization) method. This 2P method utilizes a resin hardenable through irradiation of ultraviolet ray to transfer the matrix configuration thereon.

Figure 2:
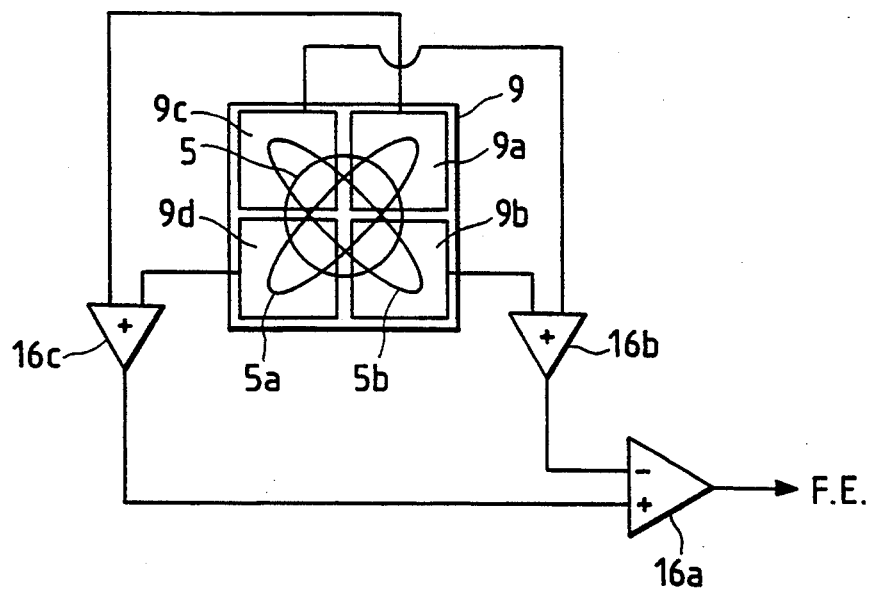
FIG. 2 is a view illustrating various change of a focusing beam irradiated onto and sensed by the photo detector, the focusing beam passing through the second hologram pattern of the first embodiment.

FIG. 2 is a view illustrating change of the focusing beam 10 irradiated onto and sensed by the photo detector 9, the focusing beam 10 passing through the second hologram pattern 4b. The second hologram pattern 4b is designed so as to satisfy the requirement of a focusing error signal (F.E) described below.

The quadrant photo sensor 9 is divided into four segments 9a, 9b, 9c, and 9d. If assumed that I(9a), I(9b), I(9c), and I(9d) represent output currents detected by these four segments 9a, 9b, 9c, and 9d, respectively, the focusing error signal (F.E.) is defined by the following equation (1).

$$F.E. = \{I(9a) + I(9d)\} - \{I(9b) + I(9c)\} \quad (1)$$

A differential amplifier 16a and two operational amplifiers 16b, 16c constitute the signal processing circuit associated with the photo detector 9, so that signals from the photo detector 9 are processed in accordance with above equation (1).

When the spot 8 accurately focuses on the information recording layer 7a of the optical disk 7, the irradiation shape of the photo detector 9 becomes a circle 5 in FIG. 2. In this case, above equation (1) is rewritten into the following equation (2).

$$F.E. = 0 \quad (2)$$

The differential amplifier 16a, serving as an output component of the signal processing circuit for the photo detector 9, generates an output of "0" in this case.

Next, if the optical disk 7 is positioned close to the top surface 1b of the glass substance 1 compared with above just focused position, the irradiation shape of the photo detector 9 becomes an ellipse 5a in FIG. 2. In this case, above equation (1) is defined by the following equation (3).

$$F.E. > 0 \quad (3)$$

On the contrary, if the optical disk 7 is positioned far from the top surface 1b of the glass substance 1 compared with above just focused position, the irradiation shape of the photo detector 9 becomes an ellipse 5b in FIG. 2. In this case, above equation (1) is defined by the following equation (4).

$$F.E. < 0 \quad (4)$$

As apparent from the foregoing description, the present invention requires no more than one holographic optical element, i.e. the compound holographic optical element 4, by which the present invention enables the optical pick-up apparatus to converge a laser beam onto the optical disk and/or the photo detector, differentiate the going and returning optical paths, and detecting the focusing error. Therefore, fabrication of the optical pick-up apparatus will be widely simplified compared with the prior art optical pick-up apparatus because positional adjustment of a plurality of holographic optical elements is no more required. As no additional holographic element is necessary, the optical path can be further shortened. This will be helpful to reduce the size of the optical pick-up apparatus.

Second Embodiment

Figure 3A:
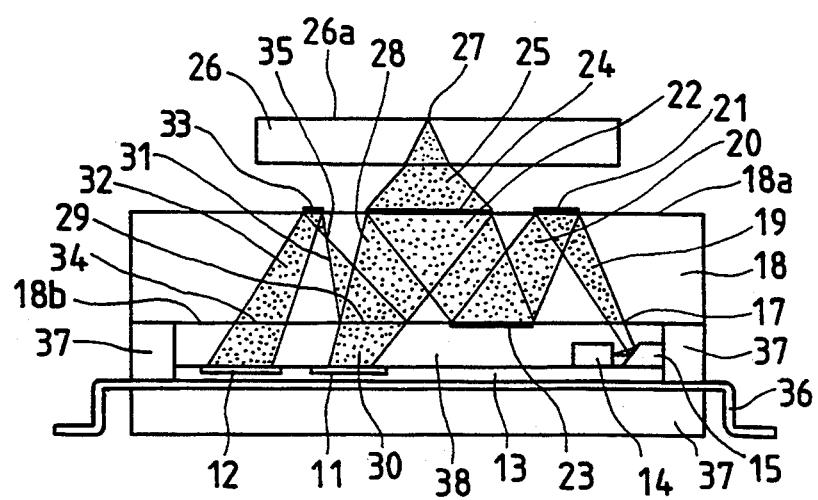
FIG. 3(a) is a schematic view showing an optical pick-up apparatus in accordance with a second embodiment of the present invention.

Hereinafter, a second embodiment of the present invention will be explained with reference to FIGS. 3(a) through 8(c). FIG. 3(a) is a schematic view showing an optical pick-up apparatus in accordance with the second embodiment of the present invention. In FIG. 3(a), first photo detector 11 and second photo detector 12 are integrally formed on an upper surface of a sensor substrate 13, so that their light receiving (or photo sensing) planes face upward. At an opposite side of the upper surface of the sensor substrate 13 there is provided a semiconductor laser chip 14. This semiconductor laser chip 14 is parallel to the upper surface of the sensor substrate 13. An axis of the laser beam emitted from a light emitting surface of the semiconductor laser chip 14 is therefore aligned parallel to the upper surface of the sensor substrate 13. Adjacent to the semiconductor laser chip 14 on the upper surface of the sensor substrate 13, a reflection prism 15 is located. A positional relationship between this reflection prism 15 and the semiconductor laser chip 14 is adjusted in such a manner that the reflection surface of the reflection prism 15 confronts with the light emitting surface of the semiconductor laser chip 14 so that a laser beam reflected at the reflection surface of the reflection prism 15 goes upward.

Figure 3B:
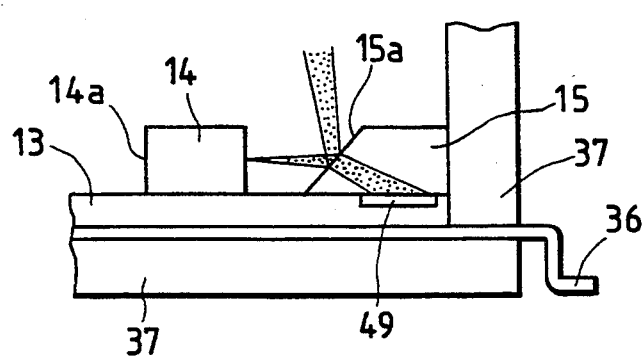
FIG. 3(b) is an enlarged view showing a semiconductor laser chip and a reflection prism constituting a part of the optical pick-up apparatus in accordance with the second embodiment.

FIG. 3(b) is an enlarged view showing the semiconductor laser chip 14 and the reflection prism 15 shown in FIG. 3(a). The reflection prism 15 has a cross section of a trapezoidal shape. The reflection surface 15a of the reflection prism 15 is coated by a semi-transmission type film which transmits a part of the laser beam emitted from the semiconductor laser chip 14 into an inside of the reflection prism 15 without being reflected by the reflection surface 15a. There is formed a monitor sensor 49 on the upper surface of the sensor substrate 13 so as to face the bottom of the reflection prism 15. This monitor sensor 49 receives the laser beam transmits the inside of the reflection prism 15 and, then, detects change of light quantity of the semiconductor laser chip 14 and feeds the detected result back to a control circuit.

This arrangement of the monitor sensor 49 with associated reflection prism 15 is unique and advantageous compared with the conventional ones. Because, this kind of monitor sensor has been conventionally located behind the semiconductor laser chip 14, in order to sense a laser beam emitted from a rear surface 14a of the semiconductor laser chip 14. The behind side of the semiconductor laser chip 14 is, however, normally located other photo detectors, e.g. the first and second photo detectors 11 and 12. Therefore, nevertheless its intention, the laser beam emitted toward the monitor sensor tends to cause stray light to these other photo detectors.

On the contrary, the present invention enables the reflection prism 15 to partly transmit the laser beam toward the monitor sensor 49 disposed beneath the reflection prism 15. In other words, the present invention no longer emits the laser means from the rear surface 14a of the semiconductor laser chip 14 and therefore no stray light disturb other photo detectors located behind the semiconductor laser chip 14.

The laser beam, having been emitted from the semiconductor laser chip 14, is partly reflected at the reflection surface 15a of the reflection prism 15 toward a light guide 18. The light guide 18 is spaced from the semiconductor laser chip 14 and photo detectors 11, 12. The light guide 18 has an incident window 17 on its second, i.e. lower, surface 18b. The laser beam, passing through this incident window 17, becomes a laser beam 19 obliquely transmitting inside the light guide 18 with a predetermined incident angle. Although the setting of this incident angle has to be accurately carried out, the present invention can ensure the accurate setting because of the previously described parallel mounting structure of the semiconductor laser chip 14 with respect to the upper surface of the sensor substrate 13. This parallel mounting structure is also advantageous in facilitating wiring arrangement and heat radiation.

The light guide 18 has a first, i.e. an upper, surface 18a, disposed in parallel with the second surface 18a. The first surface 18a confronts with an optical disk 26 located above the light guide 18. On the first surface 18a there is provided a first reflection portion 21, which reflects the laser beam 19 and changes it into the laser beam 20 proceeding to the second surface 18b. On the second surface 18b there is provided a second reflection portion 23, which reflects the laser beam 20 and changes it into the laser beam 22 proceeding to the first surface 18a. The laser beam, entered from the incident window 17, is reflected two times in the light guide 18 by the first and second reflection portions 21, 23 and, in turn, reaches a compound holographic optical element 24 formed in the vicinity of the first reflection portion 21 on the first surface 18a.

Although the laser beam 22 enters the compound holographic optical element 24 with the predetermined incident angle, the light quantity distributions of this laser beam 22 is normally elliptic formation. To correct the light quantity distributions of the laser beam 22 from above elliptic formation to circular formation, it will be best to align a minor axis of above elliptic formation of the light quantity distributions on a plane including an optical axis of the laser beam 22 in the optical path starting from the semiconductor laser chip 14 and arriving at the compound holographic optical element 24. As the laser beam normally has a polarization surface in a minor axis direction of its elliptic irradiation beam, it will be preferable to mount the semiconductor laser chip 14 to coincide the optical axis plane and the polarization plane.

Figure 4A:
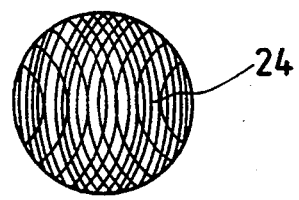
FIG. 4(a) is a view showing a hologram pattern of the second embodiment of the present invention, which is constituted by superposing a first hologram pattern and a second hologram pattern.
Figure 4B:
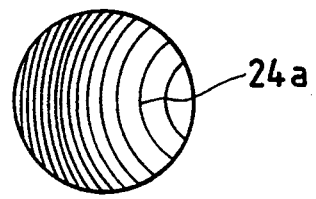
FIG. 4(b) is a view solely showing the first hologram pattern of the second embodiment.
Figure 4C:
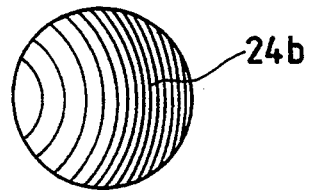
FIG. 4(c) is a view solely showing the second hologram pattern of the second embodiment.

FIGS. 4(a) to 4(c) are views illustrating the compound holographic optical element 24. This compound holographic optical element 24, shown in FIG. 4(a), is made by superposing a first hologram pattern 24a shown in FIG. 4(b) and a second hologram pattern 24b shown in FIG. 4(c). The laser beam 22, entered into the compound holographic optical element 24 with the predetermined incident angle, is converted into a focusing beam 25 therethrough. Subsequently, this focusing beam 25 converges onto an information recording surface 26a of an optical disk 26 as a spot 27.

Next, a returning path from the optical disk 26 will be explained. A laser beam, having been reflected at the information recording surface 26a of the optical disk 26, proceeds as a diffusing or diverging beam along the same path as the focusing beam 25 but in an opposite direction and reaches the compound holographic optical element 24. The second hologram pattern 24b of the compound holographic optical element 24 converts thus arriving laser beam into a diffracted focusing beam 28. The light guide 18 has a semi-transmission type window 29 on the second surface 18b thereof. This semi-transmission type window 29 transmits approximately 50% of the diffracted focusing beam 28 and reflects the remainder, i.e. approximately 50%. With this function of the semi-transmission type window 29, the diffracted focusing beam 28 is split into two. One is a semi-transmission beam 30 reaching the first photo detector 11, and the other is a reflection beam 31 proceeding to the first surface 18a in the light guide 18.

On the first surface 18a there is provided a reflection film 33, which reflects the reflection beam 31 and changes it into the reflection beam 32 proceeding to the second surface 18b. On the second surface 18b there is provided a transmission type window 34, which guides all the reflection beam 32 to the second photo detector 12. The diffracted focusing beam 28 has its focal point 35 which is designed to position on an optical path between the semi-transmission window 29 and the second photo detector 12.

Inputting/outputting various signals into/from the sensor substrate 13 is carried out through a lead frame 36. A reference numeral 37 represents a package which is made of non-conductive material such as resin and ceramics. A closed space surrounded or sealed by the light guide 18 and the package 37 is normally filled with inert gas such as nitrogen gas. It is also possible to fill this closed space with transparent resin etc.

Next, with reference to FIG. 5, constitutions of the first and second photo detectors 11, 12 and their signal processing will be explained below. The first photo detector 11 is divided into four, 11a, 11b, 11c, and 11d, segments. In the same manner, the second photo detector 12 is divided into four, 12a, 12b, 12c, and led, segments. Here, it is assumed that I(11a), I(11b), I(11c), I(11d) and I(12a), I(12b), I(12c), I(12d) represent output currents detected by these four segments 11a, 11b, 11c, 11d, and 12a, 12b, 12c, 12d, respectively. As can be understood from the circuit diagram of FIG. 5, these output currents are processed through the signal processing circuit consisting of numerous operational and differential amplifiers 16d, 16e, 16f, 16g, 16h, 16i, 16j, 16k, 16l, 16m, 16n, 16p, 16q, 16r, and 16s. This signal processing circuit is designed to fulfill the following equations (5), (6), and (7) so as to obtain the focusing error signal (F.E.), tracking error signal (T.E.), and recording signal (R. F.).

$$F.E. = [\{I(11a) + I(11d)\} - \{I(11b) + I(11c)\}] - [\{I(12a) + I(12d)\} - \{I(12b) + I(12c)\}] \quad (5)$$

$$T.E. = [\{I(11a) + I(11b)\} - \{I(11c) + I(11d)\}] - [\{I(12a) + I(12b)\} - \{I(12c) + I(12d)\}] \quad (6)$$

$$R.F. = [\{I(11a) + I(11b)\} + \{I(11c) + I(11d)\}] + [\{I(12a) + I(12b)\} + \{I(12c) + I(12d)\}] \quad (7)$$

Figure 5:
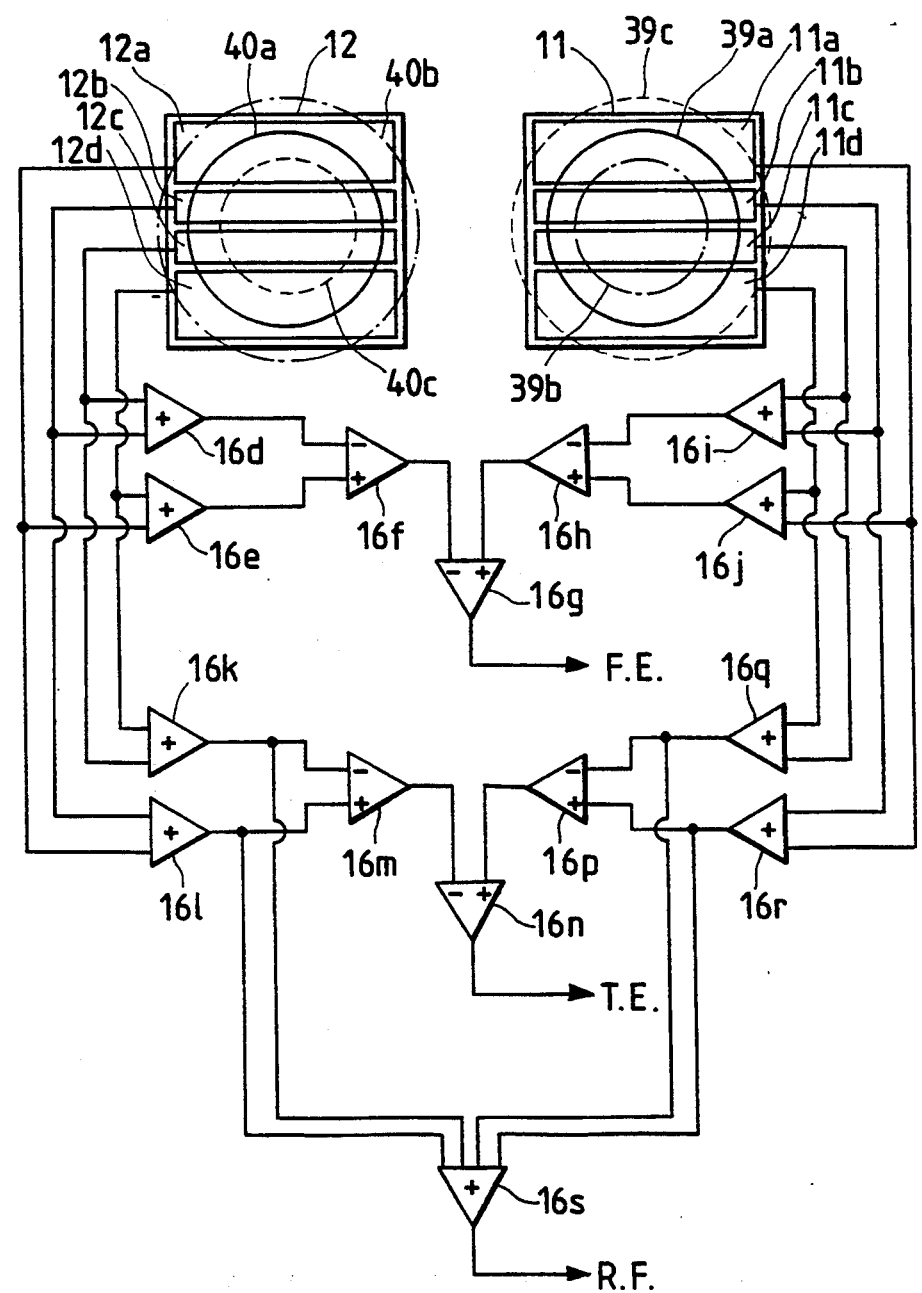
FIG. 5 is a view illustrating photo detectors and associated signal process circuit incorporated in the optical pick-up apparatus of the second embodiment.

When the spot 27 accurately focuses on the information recording layer 26a of the optical disk 26, the irradiation shapes of the first and second photo detectors 11, 12 become circles 39a, 40a in FIG. 5. In this case, above equation (5) is rewritten into the following equation (8).

$$F.E. = 0 \quad (8)$$

The differential amplifier 16g, serving as an focusing error signal output component in the signal processing circuit, generates an output of "0" in this case.

Next, if the optical disk 26 is positioned close to the first surface 18a of the light guide 18 compared with above just focused position, the irradiation shapes of the first and second photo detectors 11, 12 become circles 39c, 40c in FIG. 5. In this case, above equation (5) is defined by the following equation (9).

$$F.E. > 0 \quad (9)$$

On the contrary, if the optical disk 26 is positioned far from the first surface 18a of the light guide 18 compared with above just focused position, the irradiation shapes of the first and second photo detectors 11 and 12 become circles 39b, 40b in FIG. 5. In this case, above equation (5) is defined by the following equation (10).

$$F.E. < 0 \quad (10)$$

With above arrangement, the focusing error detection can be carried out. Such a method of detecting the focusing error is known as the spot-size-detection method. On the other hand, the tracking error can be detected by the push-pull method.

Compared with the conventional &stigmatic method of detecting the focusing error, this embodiment provides a very simplified construction because no complicated patten normally required for generating the astigmatic aberration is no more required in this embodiment. The role of the second hologram pattern 24b of the compound holographic optical element 24 is only converging the beam; therefore the second hologram pattern 24b can be simplified. All thing necessary to effect the advantage of this embodiment is to design the focal point 35 of the diffracted focusing beam 28 such that it resides on the optical path between the semi-transmission type window 29 and the second photo detector 12.

Figure 6A:
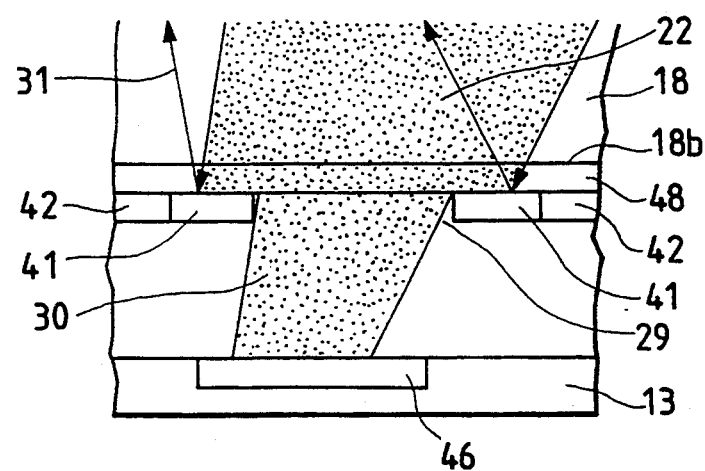
FIG. 6(a) is an enlarged view showing a constitution of a first photo detector and its vicinity of the optical pick-up apparatus of the second embodiment, through which a simplified focusing error detection is performed.
Figure 6B:
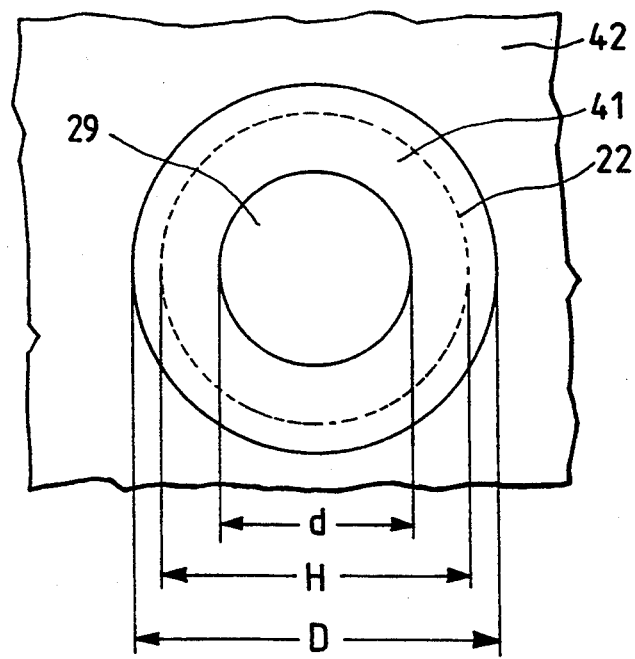
FIG. 6(b) is an enlarged view showing a diffusion film disposed adjacent to and in a predetermined positional relationship with the first photo detector of the second embodiment.
Figure 7A:
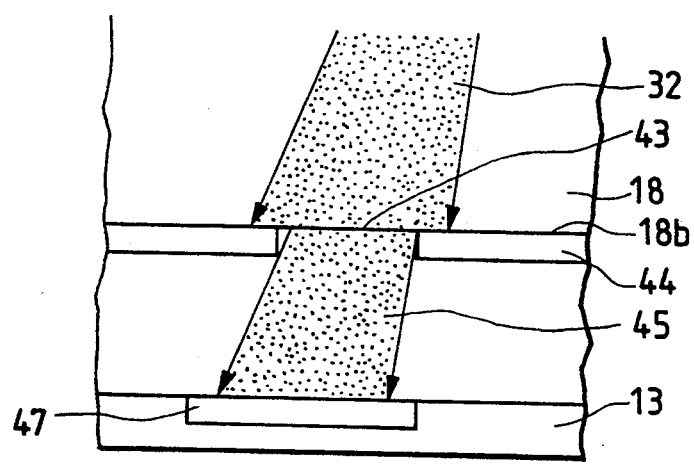
FIG. 7(a) is an enlarged view showing a constitution of a second photo detector and its vicinity of the optical pick-up apparatus of the second embodiment, through which the simplified focusing error detection is performed.
Figure 7B:
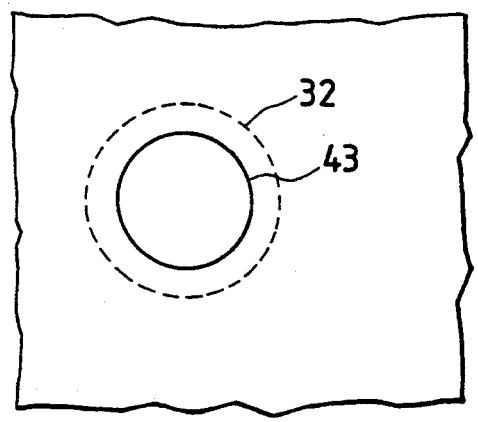
FIG. 7(b) is an enlarged view showing a transmission window disposed adjacent to and in a predetermined positional relationship with the second photo detector of the second embodiment.
Figure 8A:
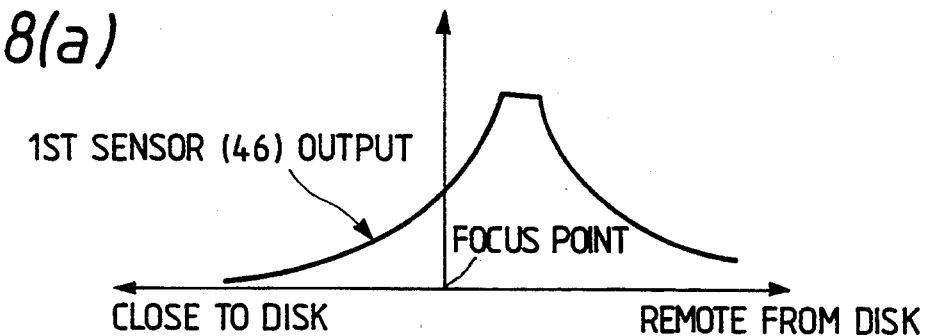
FIGS. 8(a) through 8(c) are graphs illustrating an output signal of the photo detector used for the simplified focusing error detection in the optical pick-up apparatus of the second embodiment.

FIGS. 6(a), 6(b), 7(a) and 7(b) show unique constitutions which can more simply realize a focusing error detection compared with the spot-size-detection method. In FIG. 8(a), a layer of a semi-transmission type film 48 is coated directly on the second surface 18b of the light guide 18. On the layer of the semi-transmission type film 48, both a diffusion film 41 and a light shield film 42 are coated. A partly opened space on the layer of the semi-transmission type film 48, uncovered by the diffusion film 41 and light shield film 42, is a semi-transmission window 29. The diffusion film 41 has a ring shape, as shown in FIG. 6(b), so as to surround the semi-transmission window 29. If assuming that inner diameter of the diffusion film 41 is d and an outer diameter of the diffusion film 41 is D, the relationship between the diffracted focusing beam 28 and the semi-transmission type film 48 is determined in the following equation (11).

$$d < H < D \quad (11)$$

wherein, H represents a diameter of the diffracted focusing beam 28 on the semi-transmission type film 48.

The semi-transmission beam residing in a range from d to H is diffused by the diffusion film 41 so as not give adverse effect to the reflection beam 31. In this purpose, the diffusion film 41 can be replaced by an absorption film which is capable of absorbing the laser beam. The semi-transmission beam 30, having passed through the window 29 of a diameter d, reaches a first photo detector FIG. 7(a) shows a reflection beam 32 entering a second photo detector 47. A light shield film 44 is coated directly on the second surface 18b of the light guide 18, so as to form a transmission window 43 having a diameter smaller than that of the reflection beam 32. It will be preferable that this light shield film 44 is continuously coated together with the light shield film 42 of FIG. 6(a). FIG. 7(b) shows largeness of the diameter of the reflection beam 32 in contrast with that of the transmission window 43. Only a transmission beam 45, having passed the transmission window 43, reaches a second photo detector 47. These first and second photo detectors and 47 correspond to the first and second photo detectors 11 and 12 shown in FIG. 3(a); therefore positions at which these photo detectors 46, 47 are located are substantially the same as those of the detectors 11, 12.

Figure 8B:
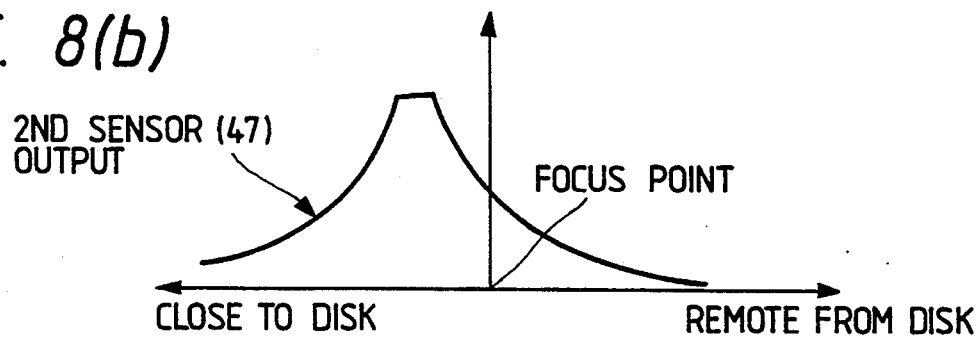
Figure 8C:
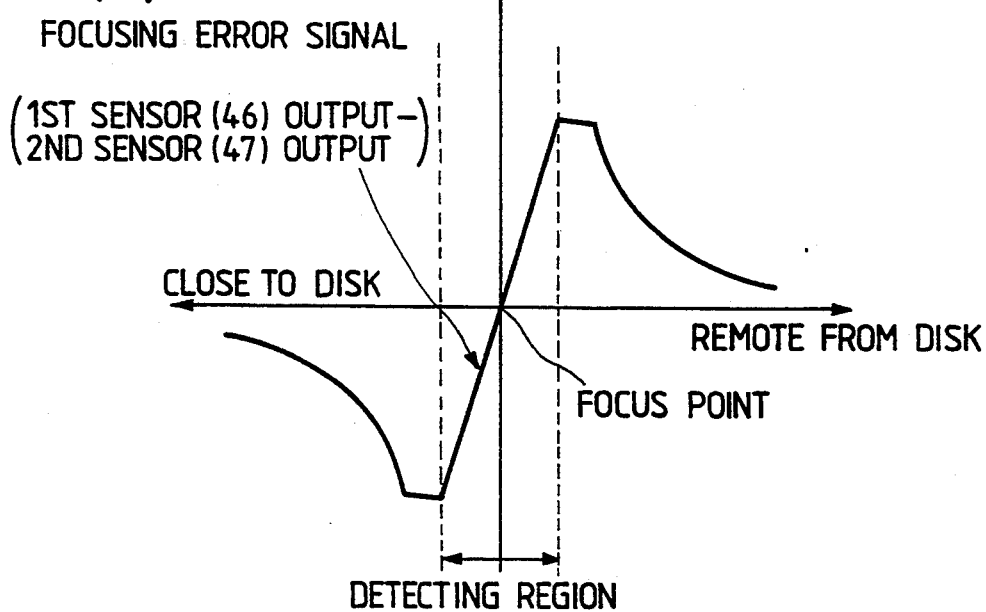

In the case where such a focusing error detecting method is adopted, the focal point 35 of the diffracted focusing beam 28 needs to be designed to reside on an optical path between the semi-transmission window 29 and the transmission window 43. The first and second photo detectors 46 and 47 are not necessary to be divided into several segments in the same manner as the first and second photo detectors 11 and 12 of FIG. 5. If the first and second photo detectors 48 and 47 have wide light receiving areas sufficient for receiving the semi-transmission beam 30 and the transmission beam 45, an output difference between these first and second photo detectors 46, 47 can be used as the focusing error signal. FIGS. 8(a), 8(b), and 8(c) show an output signal of the first photo detector 46, an output signal of the second photo detector 47, and focusing error signal obtained by subtracting the output of the second photo detector 47 from the output of the first photo detector 46, respectively.

As multi-division photo detectors, shown in FIG. 5, are not required in this focusing error detecting system, fine adjustment between the position of the first 46 and/or second 47 photo detectors and the irradiation shape of the laser beam is no more required. Therefore, this focusing error detecting system is superior in productivity and durability.

By the way, in any of the constructions disclosed in FIG. 3(a), 6(a), and 7(a), all the second surface 18b of the light guide 18 except the incident window 17, semi-transmission window 29, transmission window 34, and transmission window 43, can be coated by the same light shielding film 42. This coating can prevent various stray lights generated in the light guide 1B from adversely effecting photo detectors, meanwhile an S/N ratio of the signal can be increased. Instead of this light shield film 42, the same material as the second reflection portion 23 can be used as a coating material. Furthermore, it is needless to say that the structures of FIGS. 6(a), 6(b), 7(a), and 7(b) are not limited to this embodiment and, therefore, are applied to any other embodiments disclosed previously or later.

Third Embodiment

Figure 9A:
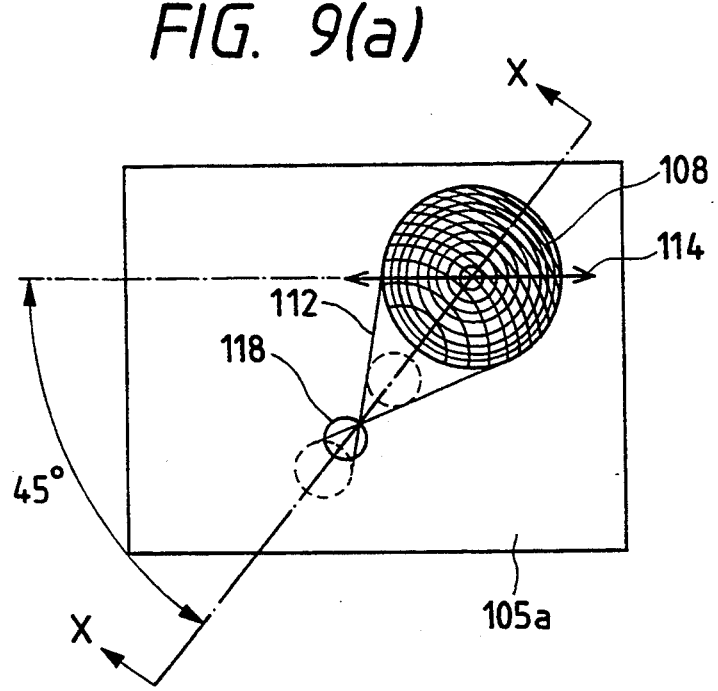
FIG. 9(a) is a plane view showing an optical pick-up apparatus in accordance with the third embodiment of the present invention.
Figure 9B:
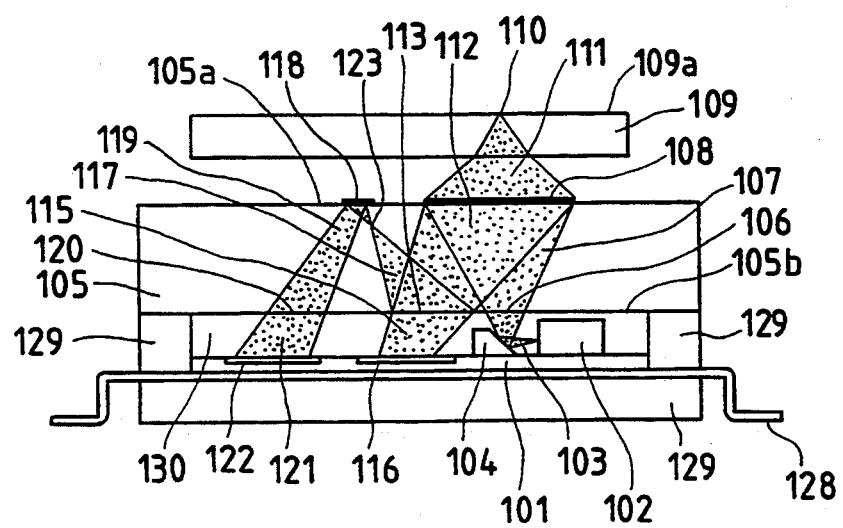
FIG. 9(b) is a sectional view showing the optical pick-up apparatus in accordance with the third embodiment, taken along a line X—X of FIG. 9(a)

Hereinafter, a third embodiment of the present invention will be explained with reference to FIGS. 9(a) through 12. FIG. 9(a) is a plane view of an optical pick-up apparatus in accordance with the third embodiment of the present invention, and FIG. 9(b) is a sectional view showing the optical pick-up apparatus in accordance with the third embodiment, taken along a line X—X of FIG. 9(a).

First of all a going optical path, starting from a semiconductor laser serving as a light emitting element and arriving at an optical disk, will be explained below. In FIG. 9(b), a semiconductor laser chip 102 is mounted in parallel with and on a sensor substrate 101. A laser beam 103, emitted horizontally from the semiconductor laser chip 102 reaches a reflection prism 104 mounted on the sensor substrate 101. The constitution of this reflection prism 104 and its vicinity is the same as the reflection prism 15 of the second embodiment and, therefore, will no more be explained in detail. This reflection prism 104, being trapezoidal shape, has a reflection surface confronting with the light emitting surface of the semiconductor laser chip 102. The laser beam, having reached the reflection prism 104, is reflected at the reflection surface and enters as a diffusing or diverging beam 107 into the inside of a transparent light guide 105 through an incident window 106 formed on a second surface 105b thereof. The light guide 105 is spaced from the semiconductor laser chip 104 and photo detectors 116, 122 later described. The light guide 105 has a first surface 105a, disposed in parallel with the second surface 105b. On the first surface 105a, there is provided a compound holographic optical element 108. The compound holographic optical element 108 has a compound hologram pattern shown in FIG. 10(a), which is the superposition of two hologram patterns shown in FIGS. 10 (b) and 10(c). One hologram pattern, shown in FIG. 10(b), has a concentric circles pattern, in which a center of these concentric circles positions at a center of the hologram pattern and a pitch between adjacent two circles becomes small as it goes outside as shown in the drawing. This hologram pattern serves as a first hologram pattern 108a capable of focusing the diffused laser beam 107 onto an information recording layer 109a of an optical disk 109 as a spot 110 of a focusing beam 111. Namely, the laser beam 103 emitted from the semiconductor laser chip 102 passes through the transparent light guide 105, diffusing symmetrically about an axis normal to the first and second surfaces 105a, 105b thereof and, in turn, passes through the compound holographic optical element 108 disposed on the first surface 105a. Then, the laser means is converged along the axis normal to the first surface 105a of the light guide 105 onto the information recording layer 109a of the optical disk 109.

Figure 10A:
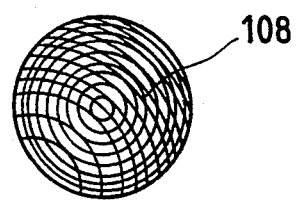
FIG. 10(a) is a view showing a hologram pattern of the third embodiment of the present invention, which is constituted by superposing a first hologram pattern and a second hologram pattern.
Figure 10B:
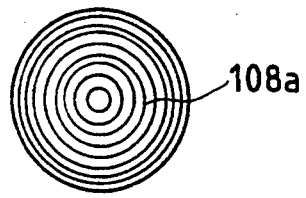
FIG. 10(b) is a view solely showing the first hologram pattern of the third embodiment.
Figure 10C:
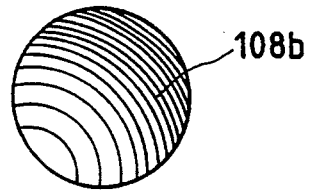
FIG. 10(c) is a view solely showing the second hologram pattern of the third embodiment.

The other hologram pattern, shown in FIG. 10(c), has eccentric circles pattern, whose center is offset lower and left in the drawing, which is different from that of the above-described first hologram pattern. This hologram pattern serves as a second hologram pattern 108b capable of converting the laser beam, being reflected at the information recording layer 109a of the optical disk 109 and returning the same optical path as the going laser beam, into a returning focusing beam 112, and also capable of diffracting this returning focusing beam 112 toward the sensor substrate 101 with a predetermined incident angle.

A returning optical path, starting from the optical disk 109, will be explained below. The second surface 105b of the light guide 105 is formed with a polarized beam splitter 113. The polarized beam splitter 113 includes a polarized beam splitting film coated thereon, which can transmits P-polarized component and reflects S-polarized component.

It is now assumed that an arrow, shown in FIG. 9(a), represents a linearly polarized beam 114, which expresses the polarization state of the diffusion beam 107 entered into the compound holographic optical element 108. The second hologram pattern 108b is designed in such a manner that the diffracted direction of the returning focusing beam 112 is inclined 45° with respect to the polarization direction of the linearly polarized beam 114. Accordingly, the diffracted returning focusing beam 112 includes both P-polarized component and S-polarized component evenly, i.e. at a ratio of approximately 50:50. Approximately half of the diffracted returning focusing beam 112 transmits the polarized beam splitter 113; therefore, light quantity of the transmission beam 115, having transmitted through the polarized beam splitter 113, is reduce to 50%. This transmission beam 115 is received by a first photo detector 116 provided on an upper surface of the sensor substrate 101. The remainder of the returning focusing beam 112, after having been reflected at the polarized beam splitter 113, proceeds toward the first surface 105a as a reflection beam 117. A reflection portion 118, formed on the first surface 105a, reflects this beam 117 so as to convert it into a reflection beam 119 proceeding toward the second surface 105b. The reflection beam 119, in turn, goes through a transmission window 120 formed on the second surface 105b and, subsequently, becomes a transmission beam 121. This transmission beam 121 is received by a second photo detector 122. The compound holographic optical element 108 and others are designed to let a focal point 123 of the diffracted returning focusing beam 112 reside on an optical path between the polarized beam splitter 113 and the second photo detector 122.

Figure 11:
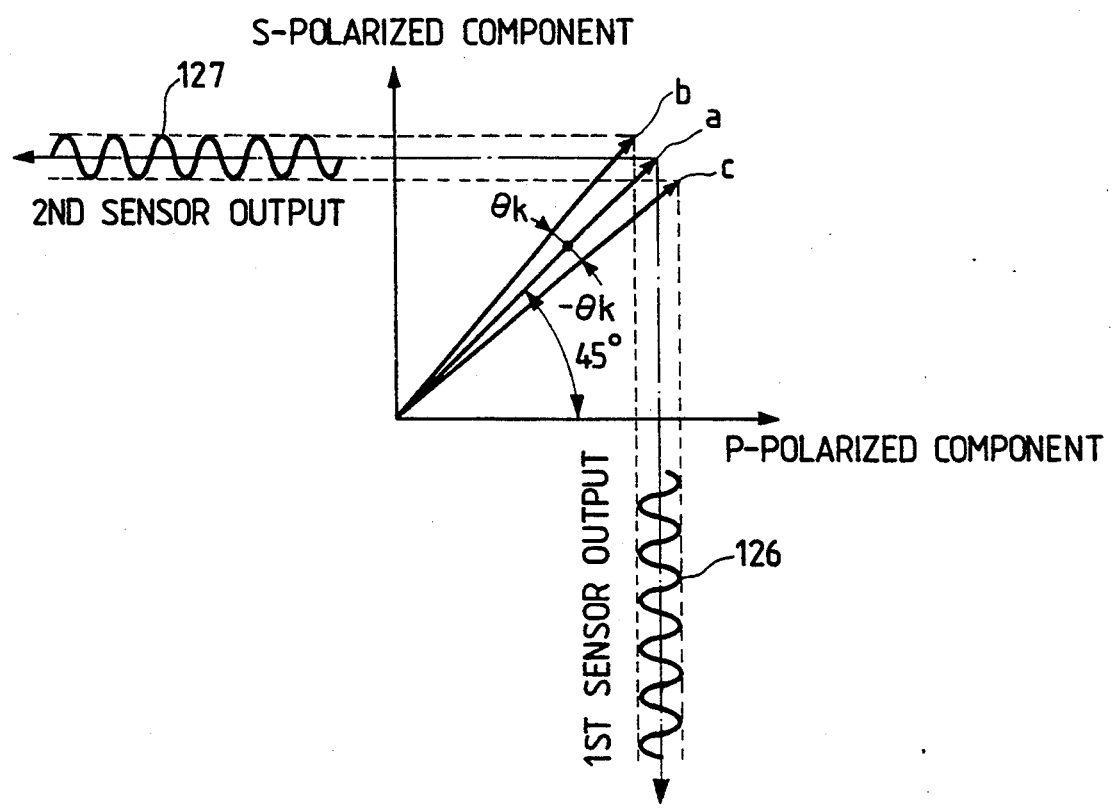
FIG. 11 is a view illustrating a principle of detecting a magneto-optical signal in the optical pick-up apparatus in accordance with the third embodiment.

Next, a method of detecting a magneto-optical signal from a magneto-optical disk, which is writable, will be explained with reference to FIGS. 11 and 12. In FIG. 11, an arrow a denotes a polarization direction of the linearly polarized beam 114 entering the compound holographic optical element 108. The compound holographic optical element 108 gives no affection to the polarization surface. Therefore, the diffracted returning focusing beam 112, i.e. the reflection beam of the linearly polarized beam 114, has the same polarization direction as the linearly polarized beam 114 as long as the information recording layer 109a of the optical disk 109 stores no information recorded. The information recording layer 109a is not magnetized when it stores no information recorded.

The compound holographic optical element 108 is designed such that the diffraction direction of the returning focusing beam 112, having such a polarization direction, is inclined 45° with respect to the polarization direction of the linearly polarized beam 114. The diffracted returning focusing beam 112 enters at 45°, as shown in FIG. 11, with respect to the polarized beam splitter 113 which transmits almost 100% of the P-polarized component and reflects almost 100% of the S-polarized component. When the linearly polarized beam 114 is reflected at a magnetized information pit on the optical disk 109, its rotational direction is varied in a range of $\pm\Theta_k$ depending on polarity and strength of the magnetization. (Kerr effect)

An arrow b denotes a polarization direction of the linearly polarized beam when the linearly polarized beam 114 rotates $\Theta_k$ from the state of the arrow a. An arrow c denotes a polarization direction of the linearly polarized beam when the linearly polarized beam 114 rotates $-\Theta_k$ from the state of the arrow a. If a magneto-optical signal, which is modulated between the linearly polarized beam shown by the arrow b and the linearly polarized beam shown by the arrow c, is entered into the polarized beam splitter 113, the P-polarized component to be detected by the first photo detector 116 is obtained as a signal 126 and also the S-polarized component to be detected by the second photo detector 122 is obtained as a signal 127. These signals 126 and 127 has a mutual phase difference of 180°, therefore a recording signal component is doubled by performing a differential amplification based on these two signals. Noises having the same phase component are mutually canceled; thus better S/N ratio is obtained.

Figure 12:
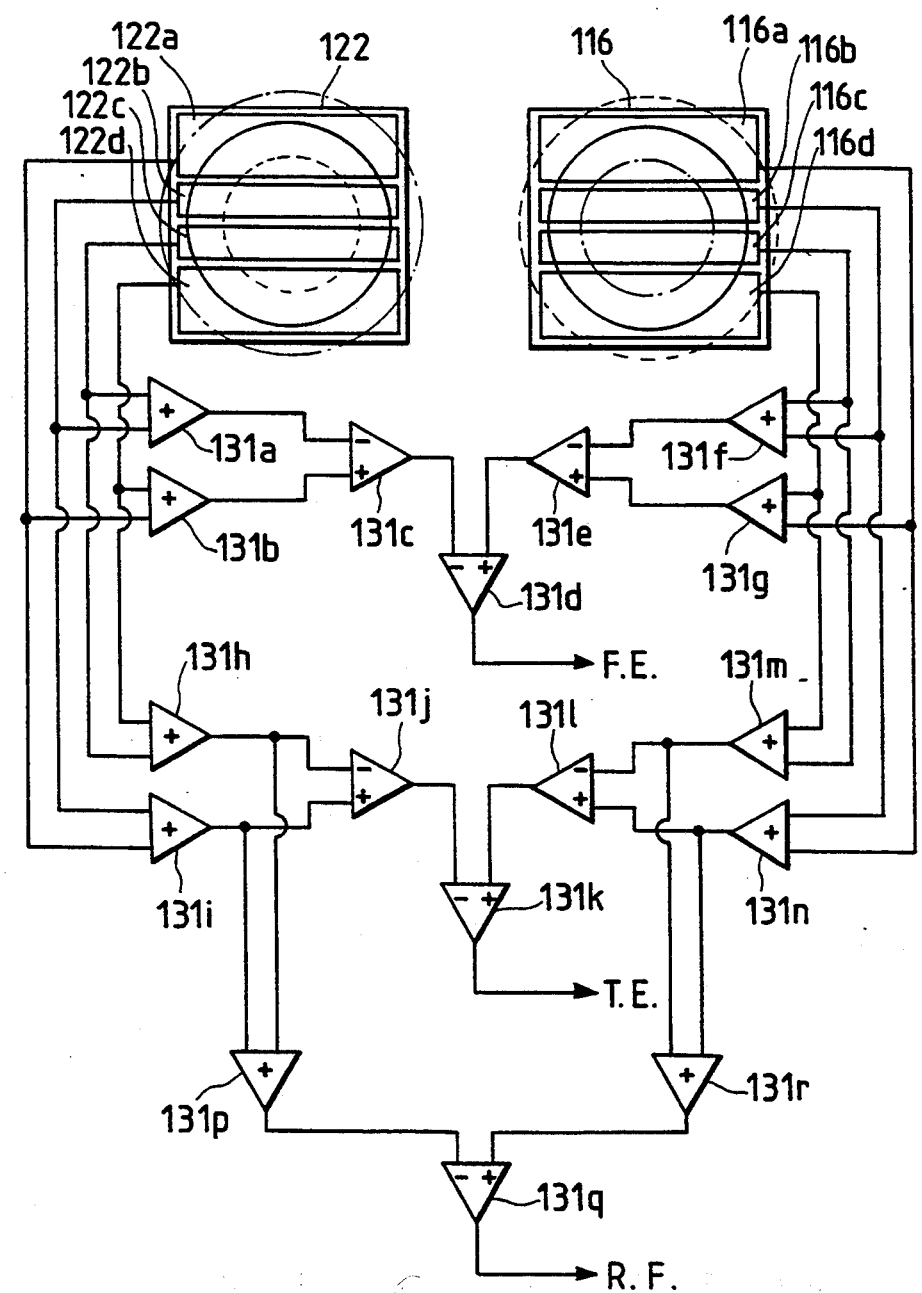
FIG. 12 is a view illustrating photo detectors and associated signal process circuit incorporated in the optical pick-up apparatus of the third embodiment.

As can be known from the signal processing circuit shown in FIG. 12, the recording signal (R.F.) is obtained from signals of the first and second photo detectors 116, 122. Numerous operational and differential amplifiers 131a, 131b, 131c, 131d, 131e, 131f, 131g, 131h, 131i, 131j, 131k, 131l, 131m, 131n, 131p, 131q, and 131r are associated to fulfill the following equations (12) (13) and (14) so as to obtain the focusing error signal (F.E.), tracking error signal (T.E.), and recording signal (R.F.).

$$F.E. = [\{I(116a)+I(116d)\}-\{I(116b)+I(116c)\}]-\\ [\{I(122a)+I(122d)\}-\{I(122b)+I(122c)\}] \quad (12)$$

$$T.E. = [\{I(116a)+I(116b)\}-\{I(116c)+I(116d)\}]-\\ [\{I(122a)+I(122b)\}-\{I(122c)+I(122d)\}] \quad (13)$$

$$R.F. = [\{I(116a)+I(116b)\}+\{I(116c)+I(116d)\}]-[\{I(122a)+I(122b)\}+\{I(122c)+I(122d)\}] \quad (14)$$

Although the diffraction direction of the focusing beam is inclined 45° with respect to the polarization direction of the linearly polarized beam 114 in this embodiment, the inclined angle can be any of 45°, 135°, 225°, and 315°.

As apparent from the foregoing description, the present invention requires no more than one holographic optical element, i.e. the compound holographic optical element 108, whose hologram pattern is the superposition of the first hologram pattern 108a and the second hologram pattern 108b. With this arrangement, the present invention enables the optical pick-up apparatus to converge a laser beam onto the optical disk and/or the photo detector, differentiate the going and returning optical paths, and detecting the focusing error. Furthermore, fabrication of the optical pick-up apparatus will be widely simplified compared with the prior art optical pick-up apparatus because positional adjustment of a plurality of holographic optical elements is no more required. As no additional holographic element is necessary, the optical path can be further shortened. This will be helpful to reduce the size of the optical pick-up apparatus.

Moreover, the second hologram pattern 108b of the compound holographic optical element 108 functions to diffract the reflection beam returning from the optical disk 109 with respect to the polarization direction of the linearly polarized beam fed from the semiconductor laser chip 102 at a predetermined angle of $(2n+1)\pi/4$ (n: integer). Accordingly, the present invention makes it possible to provide the polarized beam splitter 113 with the diffracted returning focusing beam 112 including both P-polarized component and S-polarized component evenly, i.e. at a ratio of approximately 50:50. Approximately half of the diffracted returning focusing beam 112 transmits the polarized beam splitter 113. Half of the diffracted returning focusing beam 112, i.e. the transmission beam 115, is received by the first photo detector 116. The remainder of the diffracted returning focusing beam 112, after having been reflected at the polarized beam splitter 113, is received by the second photo detector 122. Thus the diffracted returning focusing beam 112 can be split evenly for the first and second photo detectors 116 and 122.

Still further, performing the differential amplification of these first and second photo sensors 116 and 122 removes noise and brings a better quality recording (R.F.) signal.

Letting the focal point of the returning beam reside on an optical path between the polarized beam splitter 113 and the second photo detector 122 can facilitate obtaining the focusing error signal on the basis of the difference between the first and second photo detectors 116, 122 by the spot-size-detection method etc.

Yet further, fabrication of the compound holographic optical element 108 and polarized beam splitter 113 is very easy because they are patterned or formed on a flat, i.e. the first 105a or second 105b, surface of the light guide 105. Thus, it becomes possible to provide an optical pick-up apparatus for magneto-optical recording, which is a highly integrated with excellent accuracy, at a reasonable price.

Fourth Embodiment

Figure 13A:
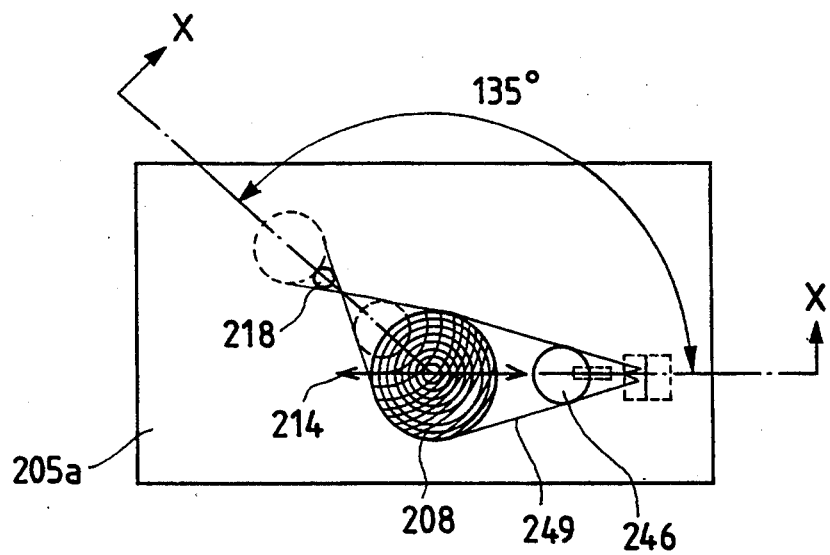
FIG. 13(a) is a plane view showing an optical pick-up apparatus in accordance with the fourth embodiment of the present invention.
Figure 13B:
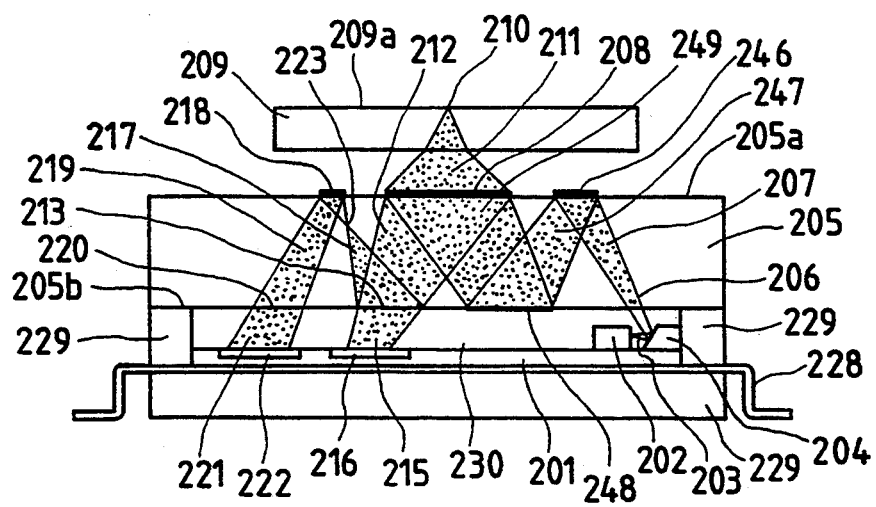
FIG. 13(b) is a sectional view showing the optical pick-up apparatus in accordance with the fourth embodiment, taken along a line X—X of FIG. 13(a)

Hereinafter, a fourth embodiment of the present invention will be explained with reference to FIGS. 13(a) through 14(c). FIG. 13(a) is a plane view of an optical pick-up apparatus in accordance with the fourth embodiment of the present invention, and FIG. 13(b) is a sectional view showing the optical pick-up apparatus in accordance with the fourth embodiment, taken along a line X—X of FIG. 13(a).

First of all a going optical path, starting from a semiconductor laser serving as a light emitting element and arriving at an optical disk, will be explained below. In FIG. 13(b), a semiconductor laser chip 202 is mounted in parallel with and on a sensor substrate 201. A laser beam 203, emitted horizontally from the semiconductor laser chip 202 reaches a reflection prism 204 mounted on the sensor substrate 201. The constitution of this reflection prism 204 and its vicinity is the same as the reflection prism 15 of the second embodiment and, therefore, will no more be explained in detail. This reflection prism 204, being trapezoidal shape, has a reflection surface confronting with the light emitting surface of the semiconductor laser chip 202. The laser beam, having reached the reflection prism 204, is reflected at the reflection surface and enters obliquely as a diffusing or diverging beam 207 into the inside of a transparent light guide 205 through an incident window 206 formed on a second, i.e. a lower, surface 205b thereof.

The light guide 205 is spaced from the semiconductor laser chip 202 and photo detectors 216, 222 later described. The light guide 205 has a first, i.e. an upper, surface 205a, disposed in parallel with the second surface 205a. The first surface 205a confronts with an optical disk 209 located above the light guide 205. On the first surface 205a there is provided a first reflection portion 246, which reflects the diffusion beam 207 and changes it into the reflection beam 247 proceeding toward the second surface 205b. On the second surface 205b there is provided a second reflection portion 248, which reflects the reflection beam 247 and changes it into the reflection beam 249 proceeding toward the first surface 205a. The laser beam, entered from the incident window 206, is reflected two times in the light guide 205 by the first and second reflection portions 246, 248 and, in turn, reaches a compound holographic optical element 208 formed in the vicinity of the first reflection portion 246 on the first surface 205a.

When the laser beam is reflected at the first and second reflection portions 246, 248, the polarization state of the laser beam is normally changed upon each reflection. For example, the laser beam, entered as a linearly polarized beam, may be changed into an elliptic polarized beam after the reflection. In reading out the magneto-optical recording information from the optical disk 209, it is mandatory to detect a slight Kerr rotation angle caused by the linearly polarized beam irradiated onto the optical disk 209. Hence, it is very important to accurately keep the state of the linearly polarized beam until it reaches the optical disk 209. In order to prevent the linearly polarization beam from being changed into an elliptic shape upon the reflection, there is provided a phase difference control film which is capable of controlling the phase difference between the first and second reflection portions 246, 248.

This phase difference control film is, for example, constituted as follows.

It is now supposed that an optical film thickness is expressed by nd, wherein d represents a thickness of the film and n represents a refraction factor. An L-layer is made of $SiO_2$ (nd=207 nm, n=1.45). An H-layer is made of $TiO_2$ (nd=199 nm, n=2.30). An incident angle of a light is 18.35° with respect to the normal of a plane. The construction of the phase difference control film is given as a lamination layer consisting of air L-layer (L-layer H-layer)[11]. Here, a meaning of the expression (L-layer H-layer)[11] is that a combined layer of (L-layer H-layer) is repeatedly laminated as much as 11 times.

Figure 14A:
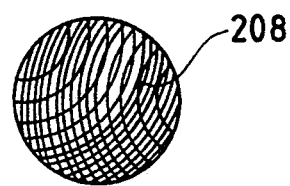
FIG. 14(a) is a view showing a hologram pattern of the fourth embodiment of the present invention, which is constituted by superposing a first hologram pattern and a second hologram pattern.
Figure 14B:
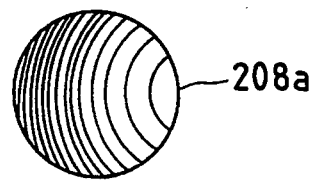
FIG. 14(b) is a view solely showing the first hologram pattern of the fourth embodiment.
Figure 14C:
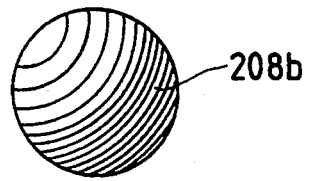
FIG. 14(c) is a view solely showing the second hologram pattern of the fourth embodiment.

The compound holographic optical element 208 has a compound hologram pattern shown in FIG. 14(a), which is the superposition of two hologram patterns shown in FIGS. 14(b) and 14(c). One hologram pattern, shown in FIG. 14(b), has eccentric circles pattern, in which a center of these concentric circles positions right of the hologram pattern as shown in the drawing. This hologram pattern serves as a first hologram pattern 208a capable of focusing the diffused laser beam 249 onto an information recording layer 209a of the optical disk 209 as a spot 210 of a focusing beam 211. Namely, the laser beam 203 emitted from the semiconductor laser chip 202 passes through the transparent light guide 205, diffusing obliquely with respect to the first and second surfaces 205a, 205b thereof and, in turn, passes through the compound holographic optical element 208 disposed on the first surface 205a. Then, the laser beam is converged along the axis normal to the first surface 205a of the light guide 205 onto the information recording layer 209a of the optical disk 209.

The other hologram pattern, shown in FIG. 14(c), has eccentric circles pattern, whose center is offset upper and left in the drawing, which is different from that of the above-described first hologram pattern. This hologram pattern serves as a second hologram pattern 208b capable of converting the laser beam, being reflected at the spot 210 and returning the same optical path as the going laser beam, into a returning focusing beam 212, and also capable of diffracting this returning focusing beam 212 toward the second surface 205b with a predetermined incident angle.

A returning optical path, starting from the optical disk 209, will be explained below. The second surface 205b of the light guide 205 is formed with a polarized beam splitter 213. The polarized beam splitter 213 includes a polarized beam splitting film coated thereon, which can transmits P-polarized component and reflects S-polarized component of the returning focusing beam 212.

It is now assumed that an arrow, shown in FIG. 13(a), represents a linearly polarized beam 214, which expresses the polarization state of the reflection beam 249 entered into the compound holographic optical element 208. The second hologram pattern 208b is designed in such a manner that the diffracted direction of the returning focusing beam 212 is inclined 135° with respect to the polarization direction of the linearly polarized beam 214. Accordingly, the diffracted returning focusing beam 212 includes both P-polarized component and S-polarized component evenly, i.e. at a ratio of approximately 50:50. Approximately half of the diffracted returning focusing beam 212 transmits the polarized beam splitter 213; therefore, light quantity of the transmission beam 215, having transmitted through the polarized beam splitter 213, is reduce to 50%. This transmission beam 215 is received by a first photo detector 216 provided on an upper surface of the sensor substrate 201. The remainder of the returning focusing beam 212, after having been reflected at the polarized beam splitter 213, proceeds toward the first surface 205a as a reflection beam 217. A reflection portion 218, formed on the first surface 205a, reflects this beam 217 so as to convert it into a reflection beam 219 proceeding toward the second surface 205b. The reflection beam 219, in turn, goes through a transmission window 220 formed on the second surface 205b and, subsequently, becomes a transmission beam 221. This transmission beam 221 is received by a second photo detector 222. The compound holographic optical element 208 and others are designed to let a focal point 223 of the diffracted returning focusing beam 212 reside on an optical path between the polarized beam splitter 213 and the second photo detector 222.

As is apparent from the foregoing description, the present invention utilizes the reflections occurring inside the optical guide 205 to guide the laser beam 203 emitted from the semiconductor laser chip 202 to the compound holographic optical element 208. As a result, it becomes possible to use the light guide 205 having a thin width compared with the optical path of the laser beam 203. Hence, the optical pick-up apparatus can be made small in size. Furthermore, the phase difference control film, provided on the reflection surface, surely prevents the linearly polarized beam from being changed into the elliptic polarized beam upon the reflection.

Although the diffraction direction of the returning focusing beam 212 is inclined 135° with respect to the polarization direction of the linearly polarized beam 214 in this embodiment, the inclined angle can be any of 45°, 135°, 225°, and 315°, i.e. an angle of $(2n+1)\pi/4$ (n: integer).

Fifth Embodiment

Figure 15A:
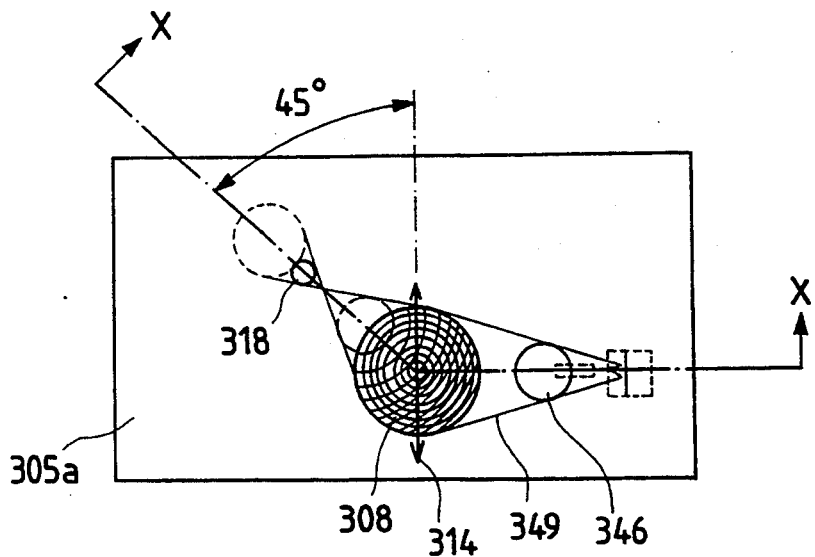
FIG. 15(a) is a plane view showing an optical pick-up apparatus in accordance with the fifth embodiment of the present invention.
Figure 15B:
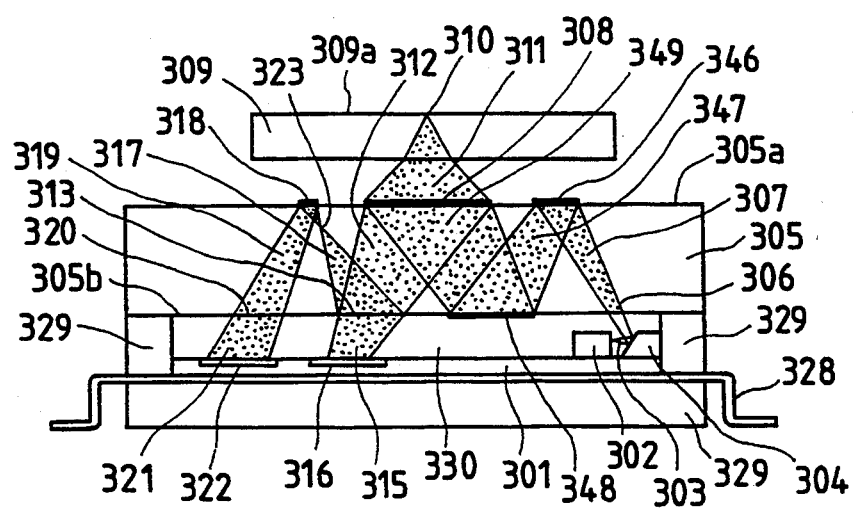
FIG. 15(b) is a sectional view showing the optical pick-up apparatus in accordance with the fifth embodiment, taken along a line X—X of FIG. 15(a)

Hereinafter, a fifth embodiment of the present invention will be explained with reference to FIGS. 15(a) through 17(b). FIG. 15(a) is a plane view of an optical pick-up apparatus in accordance with the fifth embodiment of the present invention, and FIG. 15(b) is a sectional view showing the optical pick-up apparatus in accordance with the fifth embodiment, taken along a line X—X of FIG. 15(a).

First of all a going optical path, starting from a semiconductor laser serving as a light emitting element and arriving at an optical disk, will be explained below. In FIG. 15(b), a semiconductor laser-chip 302 is mounted in parallel with and on a sensor substrate 301. A laser beam 303, emitted horizontally from the semiconductor laser chip 302, reaches a reflection prism 304 mounted on the sensor substrate 301. The constitution of this reflection prism 304 and its vicinity is the same as the reflection prism 15 of the second embodiment and, therefore, will no more be explained in detail. This reflection prism 304, being trapezoidal shape, has a reflection surface confronting with the light emitting surface of the semiconductor laser chip 302. The laser beam, having reached the reflection prism 304, is reflected at the reflection surface and enters obliquely as a diffusing or 20 diverging beam 307 into the inside of a transparent light guide 305 through an incident window 306 formed on a second, i.e. a lower, surface 305b thereof.

The light guide 305 is spaced from the semiconductor laser chip 302 and photo detectors 316, 322 later described. The light guide 305 has a first, i.e. an upper, surface 305a, disposed in parallel with the second surface 305a. The first surface 305a confronts with an optical disk 309 located above the light guide 305. On the first surface 305a there is provided a going-path reflection portion 346, which reflects the diffusion beam 307 and changes it into the reflection beam 347 proceeding toward the second surface 305b. On the second surface 305b there is provided a going-path polarized beam splitter 348, which includes a polarized beam splitting film capable of transmitting P-polarized component and reflecting S-polarized component. The laser beam, having been reflected by the going-path polarized beam splitter 348, proceeds toward the first surface 305a as a reflection beam 349. Thus, the laser beam, entered from the incident window 306, is reflected two times in the light guide 305 by the going-path reflection portion 346 and the going-path polarized beam splitter 348 and, in turn, reaches a compound holographic optical element 308 formed in the vicinity of the going-path reflection portion 346 on the first surface 305a.

Described hereinafter is the reason why the polarized beam splitting film is used in the going-path polarized beam splitter 348. When the laser beam is reflected at the reflection portions 346, the polarization state of the laser beam is normally changed upon reflection. For example, the laser beam, entered as a linearly polarized beam, may be changed into an elliptic polarized beam after the reflection. In reading out the magneto-optical recording information from the optical disk 309, it is mandatory to detect a slight Kerr rotation angle caused by the linearly polarized beam irradiated onto the optical disk 309. Hence, it is very important to accurately keep the state of the linearly polarized beam until it reaches the optical disk 309.

In order to prevent the linearly polarized beam from being changed into an elliptic shape upon the reflection, the above-described fourth embodiment adopts the phase difference control film which is capable of controlling the phase difference of the polarized components. The phase difference control film is, however, constituted in a multi-layer film structure. This may be somewhat complicated in view of manufacturing process and therefore will raise production cost.

The fifth embodiment however allows the reflection beam 347 to be changed into an elliptic polarized beam. Accordingly, the going-path reflection portion 346 can be made in a simple reflection film structure. Instead, the P-polarized component, generated by the reflection, transmit the going-path polarized beam splitter 348. Therefore, the reflection beam 349 again becomes a linearly polarized beam having S-polarized beam only. This going-path polarized beam splitter 348 is formed on the same surface (i.e. the second surface 305b) as a returning-path polarized beam splitter 313 which will be described later. Hence, these polarized beam splitter 348 and 313 can be coated continuously by the same material at the same process, so as to suppress the manufacturing cost.

Figure 16A:
FIG. 16(a) is a view showing a hologram pattern of the fifth embodiment of the present invention, which is constituted by superposing a first hologram pattern and a second hologram pattern.
Figure 16B:
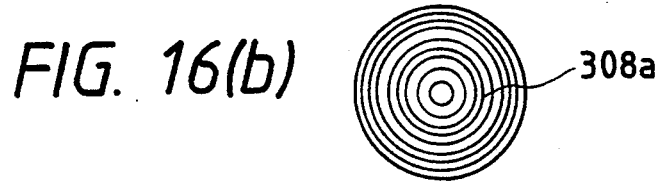
FIG. 16(b) is a view solely showing the first hologram pattern of the fifth embodiment.
Figure 16C:
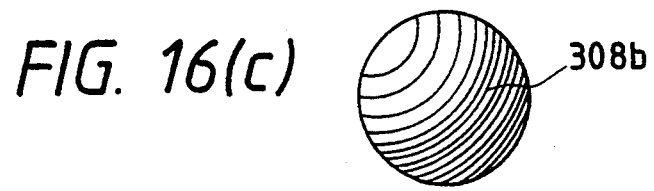
FIG. 16(c) is a view solely showing the second hologram pattern of the fifth embodiment.

The compound holographic optical element 308 has a compound hologram pattern shown in FIG. 16(a), which is the superposition of two hologram patterns shown in FIGS. 16(b) and 16(c). One hologram pattern, shown in FIG. 16(b), has a concentric circles pattern, in which a center of these concentric circles positions in the center of the hologram pattern as shown in the drawing. This hologram pattern serves as a first hologram pattern 308a capable of focusing the diffused laser beam 349 onto an information recording layer 309a of the optical disk 309 as a spot 310 of a focusing beam 311. Namely, the laser beam 303 emitted from the semiconductor laser chip 302 passes through the transparent light guide 305, diffusing obliquely with respect to the first and second surfaces 305a, 305b thereof and, in turn, passes through the compound holographic optical element 308 disposed on the first surface 305a. Then, the laser beam is converged along the axis normal to the first surface 305a of the light guide 305 onto the information recording layer 309a of the optical disk 309.

The other hologram pattern, shown in FIG. 16(c), has eccentric circles pattern, whose center is offset upper and left in the drawing, which is different from that of the above-described first hologram pattern. This hologram pattern serves as a second hologram pattern 308b capable of converting the laser beam, being reflected at the spot 310 and returning the same optical path as the going laser beam, into a returning focusing beam 312, and also capable of diffracting this returning focusing beam 312 toward the second surface 305b with a predetermined incident angle.

A returning optical path, starting from the optical disk 309, will be explained below. The second surface 305b of the light guide 305 is formed with the returning-path polarized beam splitter 313. This returning-path polarized beam splitter 313 includes a polarized beam splitting film coated thereon, which can transmits P-polarized component and reflects S-polarized component of the returning focusing beam 312.

It is now assumed that an arrow, shown in FIG. 15(a), represents a linearly polarized beam 314, which expresses the polarization state of the reflection beam 349 entered into the compound holographic optical element 308. The second hologram pattern 308b is designed in such a manner that the diffracted direction of the returning focusing beam 312 is inclined 45° with respect to the polarization direction of the linearly polarized beam 314. Accordingly, the diffracted returning focusing beam 312 includes both P-polarized component and S-polarized component evenly, i.e. at a ratio of approximately 50:50. Approximately half of the diffracted returning focusing beam 312 transmits the returning-path polarized beam splitter 313; therefore, light quantity of the transmission beam 315, having transmitted through the returning-path polarized beam splitter 313, is reduce to 50%. This transmission beam 315 is received by a first photo detector 316 provided on an upper surface of the sensor substrate 301. The remainder of the returning focusing beam 312, after having been reflected at the returning-path polarized beam splitter 313, proceeds toward the first surface 305a as a reflection beam 317. A returning-path reflection portion 318, formed on the first surface 305a, reflects this beam 317 so as to convert it into a reflection beam 319 proceeding toward the second surface 305b. The reflection beam 319, in turn, goes through a transmission window 320 formed on the second surface 305b and, subsequently, becomes a transmission beam 321. This transmission beam 321 is received by a second photo detector 322. The compound holographic optical element 308 and others are designed to let a focal point 323 of the diffracted returning focusing beam 312 reside on an optical path between the returning-path polarized beam splitter 313 and the second photo detector 322.

Figure 17A:
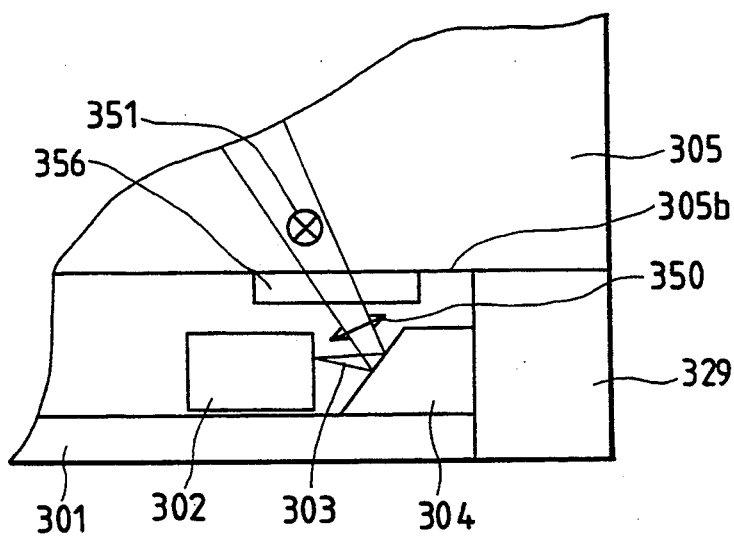
FIG. 17(a) is an enlarged view showing a construction of a semiconductor laser chip and an optical rotator which constitute an essential part of the fifth embodiment, in which a P-polarized beam emitted from the semiconductor laser chip transmits the optical rotator and changes into an S-polarized beam.
Figure 17B:
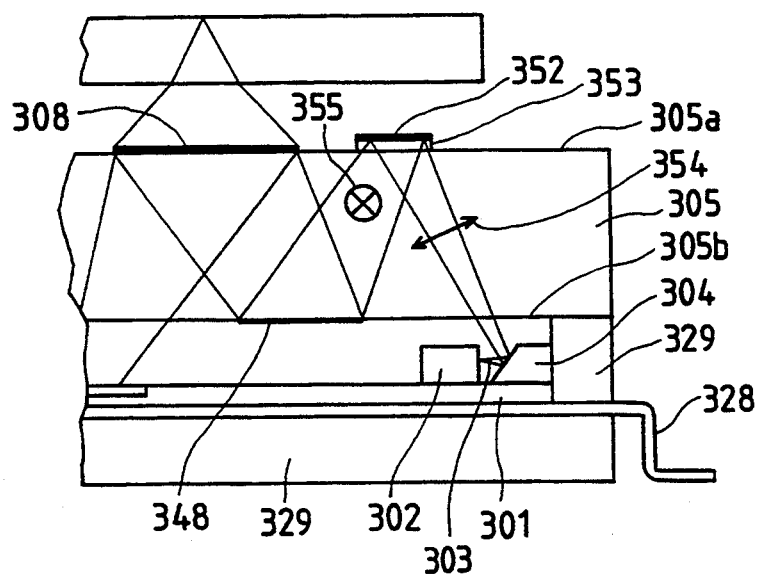
FIG. 17(b) is an enlarged view showing a construction of a semiconductor laser chip and a quarterwave plate which constitute an essential part of the fifth embodiment, in which a P-polarized beam emitted from the semiconductor laser chip is reflected at and changed into an S-polarized beam by the quarterwave plate.

FIGS. 17(a) and 17(b) show the construction applied in a case where a laser beam emitted from the semiconductor laser chip 302 is a P-polarized beam with respect to the second surface 305b. FIG. 17(a) is an enlarged view showing a construction of the semiconductor laser chip 302 and an optical rotator 356 (for example, a halfwave plate). This optical rotator 356, mounted on the second surface 305b, transmits a P-polarized beam 350 emitted from the semiconductor laser chip 302 and changes it into an S-polarized beam 351. FIG. 17(b) is an enlarged view showing a construction of a semiconductor laser chip 302 and a quarterwave plate 353 which includes a reflection film 352 coated on a backside thereof. The P-polarized beam 354, emitted from the semiconductor laser chip 302, goes and returns in this quarterwave plate 353 being reflected at and changed into an S-polarized beam 533 by the quarterwave plate 353. An advantage of converting the P-polarized beam emitted from the semiconductor laser chip 302 into the S-polarized beam will be explained below.

The laser beam 303 emitted from the semiconductor laser chip 302 normally has light quantity distributions of elliptic formation. Furthermore, the polarization surface resides in a direction of the minor axis of the ellipse. In order to correct the light quantity distributions of the laser beam 303 entering into the compound holographic optical element 308 from above elliptic formation to circular formation, it will be best to align the minor axis of above elliptic formation on a plane including an optical axis of the laser beam 303 in the optical path starting from the semiconductor laser chip 302 and arriving at the compound holographic optical element 308 and to enter the S-polarized beam into the going-path polarized beam splitter 348. With this alignment, it becomes possible to provide the compound holographic optical element 308 with a linearly polarized beam including only S-polarized beam of better-quality.

Although the diffraction direction of the returning focusing beam 312 is inclined 45° with respect to the polarization direction of the linearly polarized beam 314 in this embodiment, the inclined angle can be any of 45°, 135°, 225°, and 315°, i.e. an angle of $(2n+1)\pi/4$ (n: integer).

As is apparent from the foregoing description, the present invention utilizes the reflections occurring inside the optical guide 305 to guide the laser beam 303 emitted from the semiconductor laser chip 302 to the compound holographic optical element 308.

Furthermore, the polarized beam splitter 348 surely prevents the linearly polarized beam from being changed to the elliptic polarized beam upon the reflection in the optical guide 305.

Moreover, if the polarized beam splitting film of the going-path polarized beam splitter 348 and the polarized beam splitting film of the returning-path polarized beam splitter 313 are coated continuously by the same material at the same process, it becomes possible to suppress the manufacturing cost.

Sixth Embodiment

Figure 18A:
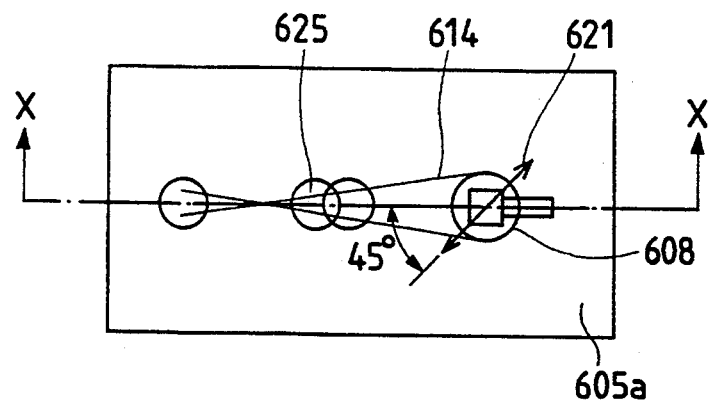
FIG. 18(a) is a plane view showing an optical pick-up apparatus in accordance with the sixth embodiment of the present invention.
Figure 18B:
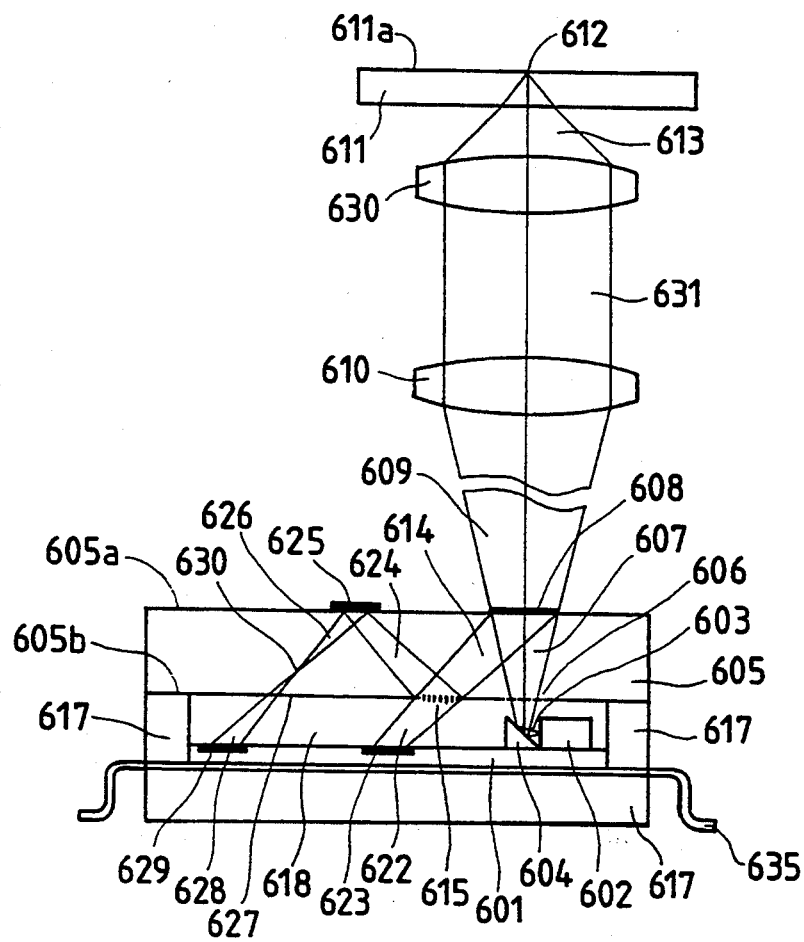
FIG. 18(b) is a sectional view showing the optical pick-up apparatus in accordance with the sixth embodiment, taken along a line X—X of FIG. 18(a)

Hereinafter, a sixth embodiment of the present invention will be explained with reference to FIGS. 18(a) through 21 (b). FIG. 18(a) is a plane view of an optical pick-up apparatus in accordance with the sixth embodiment of the present invention, and FIG. 18(b) is a sectional view showing the optical pick-up apparatus in accordance with the sixth embodiment, taken along a line X—X of FIG. 18(a).

First of all a going optical path, starting from a semiconductor laser serving as a light emitting element and arriving at an optical disk, will be explained below. In FIG. 18(b), a semiconductor laser chip 602 is mounted in parallel with and on a sensor substrate 601. A laser beam 603, emitted horizontally from the semiconductor laser chip 802, reaches a reflection prism 604 mounted on the sensor substrate 601. The constitution of this reflection prism 604 and its vicinity is the same as the reflection prism 15 of the second embodiment and, therefore, will no more be explained in detail. This reflection prism 604, being trapezoidal shape, has a reflection surface confronting with the light emitting surface of the semiconductor laser chip 602. The laser beam, having reached the reflection prism 604, is reflected at the reflection surface and enters as a diffusing or diverging beam 607 into the inside of a transparent light guide 605 through an incident window 606 formed on a second, i.e. a lower, surface 605b thereof.

The light guide 605 is spaced from the semiconductor laser chip 602 and photo detectors 623, 629 later described. The light guide 605 has a first, i.e. an upper, surface 605a, disposed in parallel with the second surface 605b. There is formed a holographic optical element 608 on the first surface 605a. The diffusing or diverging beam 607 reaches the holographic optical element 608, in which the diffusing or diverging beam 607 is diffracted. A diffracted beam goes out of the light guide 605 and becomes a diffusing or diverging beam 609 consisting of 0-order diffraction beam. This diffusing or diverging beam 609 reaches a collimator lens 610 and is converted into a parallel beam 631 therethrough. This parallel beam 631 reaches an objective lens 630. Then, the beam passing through the objective lens 630 becomes a focusing beam 613 and is focused on an information recording layer 611a of the optical disk 611 as a spot 612. Namely, the laser beam 603 emitted from the semiconductor laser chip 602 passes through the transparent light guide 605, diffusing normal to the first and second surfaces 605a, 605b thereof and, in turn, passes through the holographic optical element 608 disposed on the first surface 605a. Then, the laser beam is converged along the axis normal to the first surface 605a of the light guide 605 onto the information recording layer 611a of the optical disk 611 after passing through the collimator lens 610 and the objective lens 630.

Figure 19:
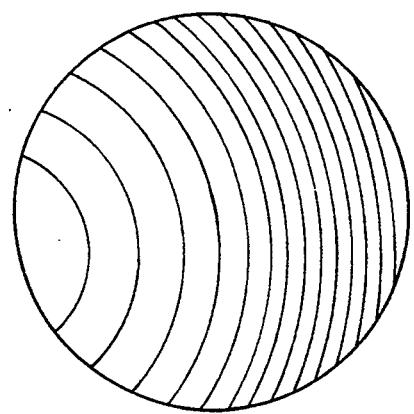
FIG. 19 is a view showing a hologram pattern of the sixth embodiment of the present invention; which is constituted by a single hologram pattern.

The holographic optical element 608 has at least one hologram pattern shown in FIG. 19. This hologram pattern, shown in FIG. 19, has eccentric circles pattern, in which a center of these concentric circles positions at the center of the hologram pattern as shown in the drawing. This hologram pattern converts the laser beam, being reflected at the spot 612 and returning the same optical path as the going laser beam, into a returning diffraction beam 614 diffracted toward the second surface 605b with a predetermined incident angle.

A returning optical path, starting from the optical disk 611, will be explained below. The laser beam, having been reflected at the optical disk 611, reaches the objective lens 630 and is converted into a parallel beam, which advances toward the collimator lens 610. The leaser beam is, in turn, converted into a focusing beam by the collimator lens 610. The laser beam is subsequently converted into the returning diffraction beam 614 by the holographic optical element 608. The second surface 605b of the light guide 605 is formed with the returning-path polarized beam splitter 615. This returning-path polarized beam splitter 615 includes a polarized beam splitting film coated thereon, which can transmits P-polarized component and reflects S-polarized component of the returning diffraction beam 614.

It is now assumed that an arrow, shown in FIG. 18(a), represents a linearly polarized beam 621, which expresses the polarization state of the diffusing beam 607 entered into the holographic optical element 608. The hologram pattern of the holographic optical element 608 is designed in such a manner that the diffraction direction of the returning diffraction beam 614 is inclined 45° with respect to the polarization direction of the linearly polarized beam 621. Accordingly, the returning diffraction beam 614 includes both P-polarized component and S-polarized component evenly, i.e. at a ratio of approximately 50:50. Approximately half of the returning diffraction beam 614 transmits the returning-path polarized beam splitter 615; therefore, light quantity of the transmission beam 622, having transmitted through the returning-path polarized beam splitter 615, is reduce to 50%. This transmission beam 622 is received by a first photo detector 623 provided on an upper surface of the sensor substrate 601. The remainder of the returning diffraction beam 614, after having been reflected at the returning-path polarized beam splitter 615, proceeds toward the first surface 605a as a reflection beam 624. A returning-path reflection portion 625, formed on the first surface 605a, reflects this beam 624 so as to convert it into a reflection beam 626 proceeding toward the second surface 605b. The reflection beam 626, in turn, goes through a transmission window 627 formed on the second surface 605b and, subsequently, becomes a transmission beam 628. This transmission beam 628 is received by a second photo detector 629. The holographic optical element 608 and others are designed to let a focal point 630 of the returning diffraction beam 614 reside on an optical path between the returning-path polarized beam splitter 615 and the second photo detector 629.

Figure 20A:
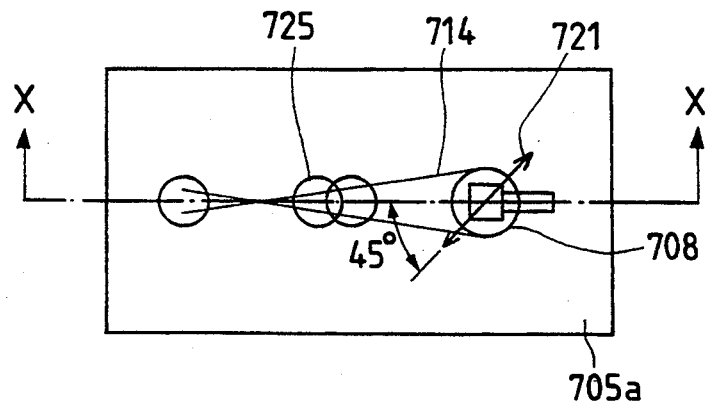
FIG. 20(a) is a plane view showing an optical pick-up apparatus in accordance with a modification of the sixth embodiment of the present invention.
Figure 20B:
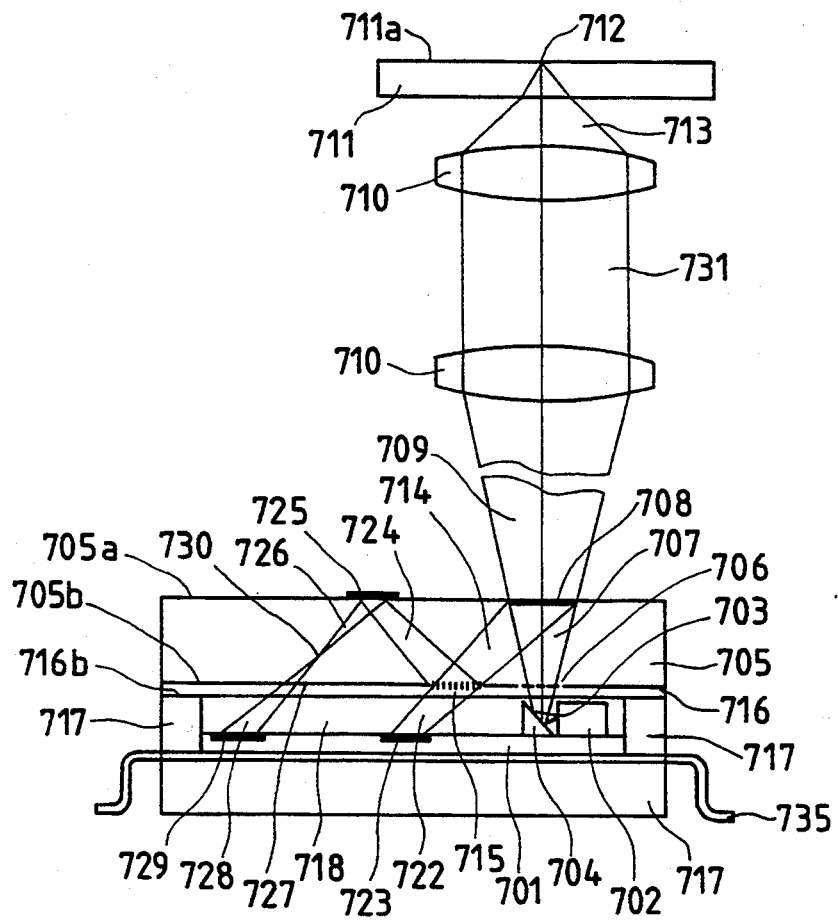
FIG. 20(b) is a sectional view showing the optical pick-up apparatus in accordance with the modification of the sixth embodiment, taken along a line X—X of FIG. 20(a)

FIGS. 20(a) and 20(b) show a modified construction of the sixth embodiment. As shown in FIG. 20(b), there is provided a polarized beamsplitter auxiliary member 716 beneath a light guide 705. This auxiliary member 716 is transparent and directly connected to a second surface 705b of the light guide 705. A refractive index of this auxiliary member 716 is substantially identical with that of the light guide 705. This auxiliary member 716 increases a polarized beam splitting efficiency of the polarized beam splitter 715. A polarized beam splitter 715 can be completely surrounded by the light guide 705 and the auxiliary member 716. The application of this auxiliary member 716 brings a remarkable improvement in productivity. Because, it is no longer necessary to fill a space 718 with a transparent resin material or the like having substantially the same refractive index as the light guide 705. This space 718 is surrounded by the light guide 705 and a package 717. The package 717 is usually made of a nonconductive material such as ceramic. In FIGS. 20(a) and 20(b), the remainder of components disclosed in the drawings are substantially the same as those of FIGS. 18(a) and 18(b) and therefore will no more be explained.

Figure 21A:
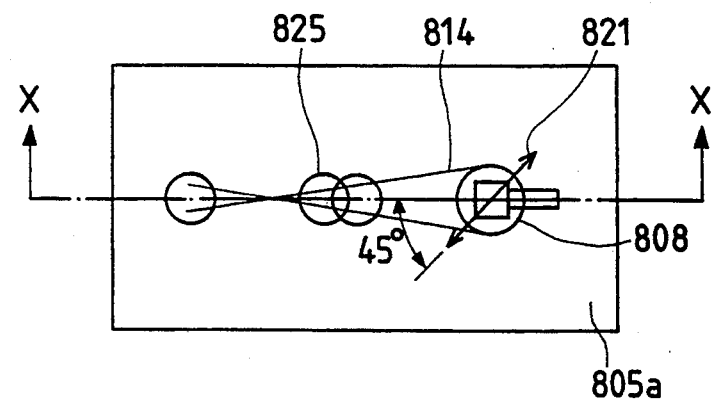
FIG. 21(a) is a plane view showing an optical pick-up apparatus in accordance with another modification of the sixth embodiment of the present invention.
Figure 21B:
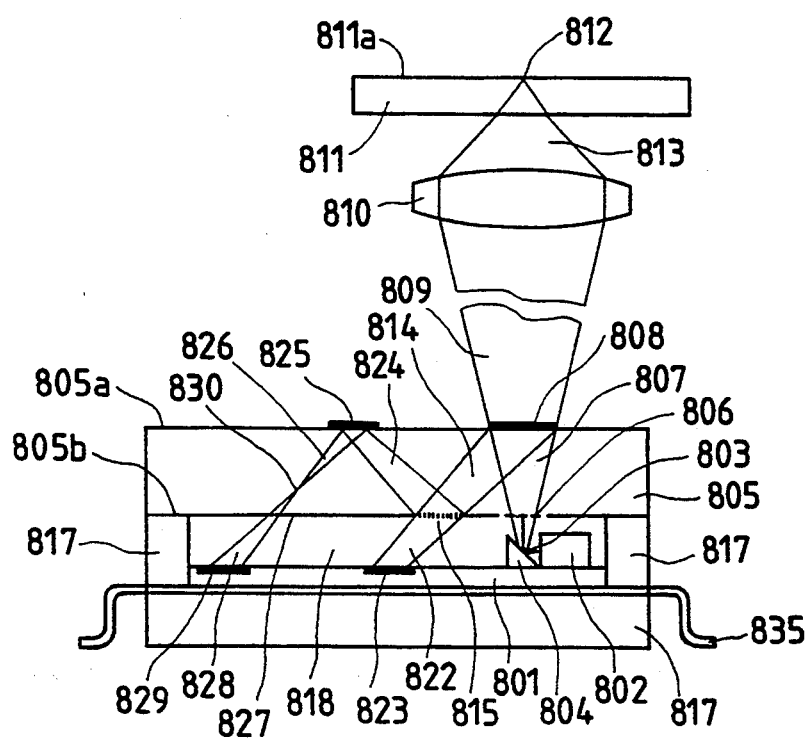
FIG. 21(b) is a sectional view showing the optical pick-up apparatus in accordance with another modification of the sixth embodiment, taken along a line X—X of FIG. 21(a)
Figure 22:
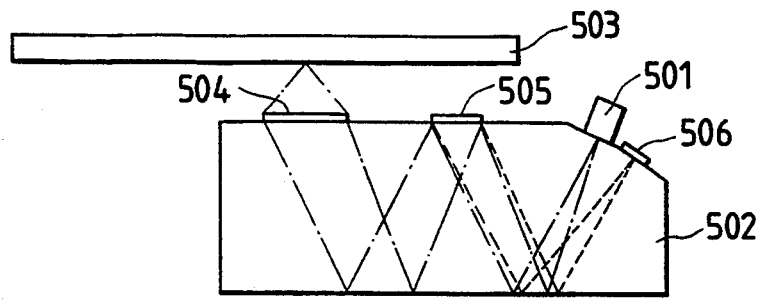
FIG. 22 is a view showing a conventional optical pick-up apparatus utilizing a plurality of reflections of a laser beam in a light guide.
Figure 23:
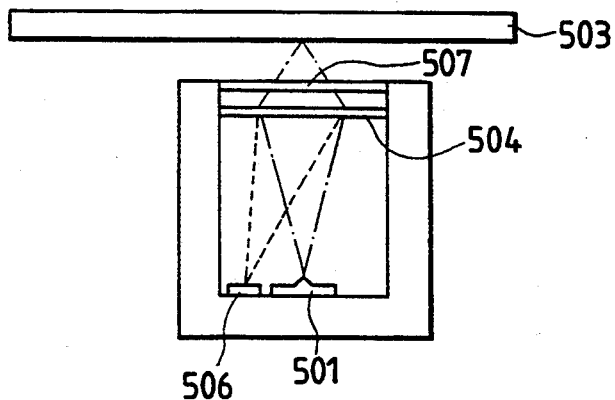
FIG. 23 is a view showing another conventional optical pick-up apparatus including a pair of holographic optical elements, one holographic optical element converging a going laser beam and the other holographic optical element causing diffraction of a returning laser beam.
Figure 24:
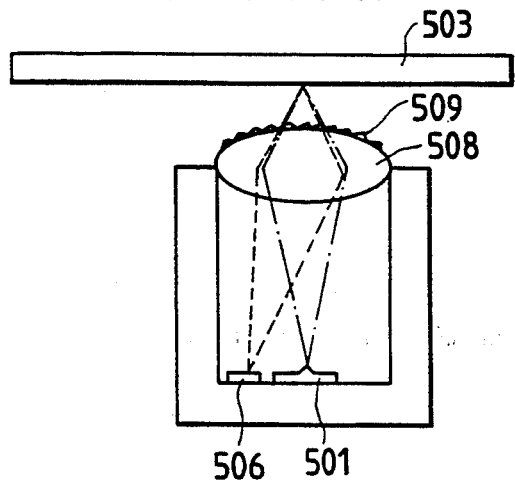
FIG. 24 is a view showing still another optical pick-up apparatus using an objective lens on the spherical surface of which a holographic optical element is integrally or directly formed to cause diffraction of a laser beam.
Figure 25:
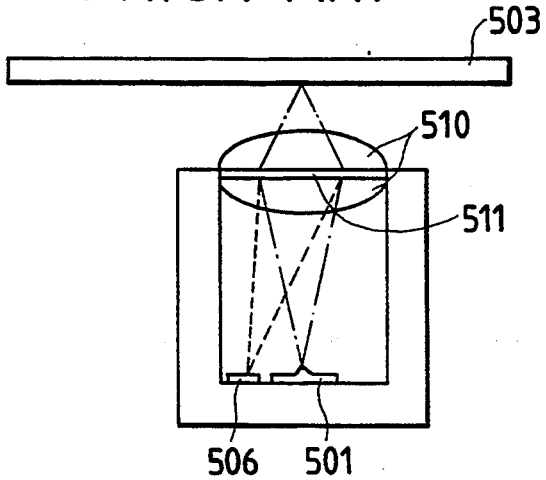
FIG. 25 is a view showing yet another optical pick-up apparatus using a complex objective lens whose body is split into two by a plane normal to an axis thereof and a holographic optical element for diffraction is sandwiched therebetween.

FIGS. 21(a) and 21(b) show still another modification of the sixth embodiment. In FIG. 21(b), there is provided a objective lens 810 of finite·system. The collimator lens 610 and the objective lens 630 of the sixth embodiment can be replaced by this infinite-system objective lens 810. In FIGS. 21(a) and 21(b), the remainder of components disclosed in the drawings are substantially the same as those of FIGS. 18(a) and 18(b) and therefore will no more be explained.

Although the diffraction direction of the returning diffraction beam 614 is inclined 45° with respect to the polarization direction of the linearly polarized beam 621 in this embodiment, the inclined angle can be any of 45°, 135°, 225°, and 315°, i.e. an angle of $(2n+1)\pi/4$ (n: integer).

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An optical pick-up apparatus comprising:
   a light emitting element for emitting and supplying a linearly polarized light to an optical disk;
   first and second photo detectors for receiving light reflected from said optical disk;
   a holographic optical element having a hologram pattern diffracting light reflected from said optical disk in a direction inclined at an angle of $(2n+1)\pi/4$, wherein n is an integer, with respect to said linearly polarized light;
   a polarized beam splitter for transmitting either one of P-polarized component and S-polarized component of light reflected from the optical disk and passed through said holographic optical element toward said first photo detector and for reflecting the other of said P-polarized component and S-polarized component toward said second photo detector;
   a focal point of said light reflected at the optical disk and passed through said holographic optical element residing on an optical path between said polarized beam splitter and said second photo sensor; and
   said first and second photo detectors detecting focusing error and tracking error as well as information recorded on the optical disk.

2. An optical pick-up apparatus comprising:
   a light emitting element for emitting and supplying a linearly polarized light to an optical disk;
   an objective lens converging light emitted from said light emitting element onto said optical disk;
   first and second photo detectors for receiving light reflected from said optical disk;
   a transparent light guide having two surfaces, a first surface which confronts with said optical disk and a second surface which confronts with said emitting element and said photo detectors, for guiding light emitted from said light emitting element onto said optical disk through said objective lens and guiding light reflected from the optical disk toward said photo detectors;
   a holographic optical element, provided on said first surface, having a hologram pattern diffracting the light reflected from the optical disk and passed through said objective lens in a direction inclined at an angle of $(2n+1)\pi/4$, wherein n is an integer, with respect to said linearly polarized light;
   a polarized beam splitter, provided on said second surface, for transmitting either one of P-polarized component and S-polarized component of the light reflected from the optical disk and passed through said holographic optical element toward said first photo detector and for reflecting the other of said P-polarized component and S-polarized component;
   a reflection portion, provided on said first surface, for receiving and reflecting said light reflected by said polarized beam splitter toward said second photo detector;
   a focal point of said light reflected from the optical disk and passed through said objective lens residing on an optical path between said polarized beam splitter and said second photo sensor; and
   said first and second photo detectors detecting focusing error and tracking error as well as information recorded on the optical disk.

3. An optical pick-up apparatus in accordance with claim 2, further comprising an incident light reflection member for reflecting and leading the light emitted from said light emitting element toward said light guide.

4. An optical pick-up apparatus in accordance with claim 2, wherein said second surface is provided with a transparent member whose refractive index is substantially identical with that of said light guide.

5. An optical pick-up apparatus in accordance with claim 2, further comprising a collimator lens disposed between said objective lens and said light guide.

* * * * *